United States Patent
Yamamoto et al.

[11] Patent Number: 6,076,584
[45] Date of Patent: Jun. 20, 2000

[54] APPARATUS FOR REMOVING COATING FROM COATED PRODUCT

[75] Inventors: Hiroshi Yamamoto; Toshikazu Watanabe, both of Ota, Japan

[73] Assignee: Fuji Jukogyo Kabushiki Kaisha, Japan

[21] Appl. No.: 08/942,293

[22] Filed: Oct. 1, 1997

[30] Foreign Application Priority Data

Oct. 4, 1996 [JP] Japan ................................. 8-264743

[51] Int. Cl.⁷ ................................................ B32B 35/00
[52] U.S. Cl. .......................... 156/584; 156/344; 100/53; D29/426.3; D29/239; 264/37.3
[58] Field of Search ................... 29/426.4, 239, 29/426.1, 426.3, 426.5; 156/344, 584, 94, 358; 100/53; 264/37.3, 37.33

[56] References Cited

U.S. PATENT DOCUMENTS

| | | | |
|---|---|---|---|
| 4,599,131 | 7/1986 | Matuszak | 156/584 |
| 4,918,964 | 4/1990 | Engel et al. | 72/225 |
| 5,100,063 | 3/1992 | MacLeod et al. | 241/14 |
| 5,194,109 | 3/1993 | Yamada | 156/344 X |
| 5,225,025 | 7/1993 | Lambing et al. | 156/358 |
| 5,304,276 | 4/1994 | MacLeod et al. | 156/344 |
| 5,478,434 | 12/1995 | Kerr et al. | 156/584 |
| 5,579,685 | 12/1996 | Raio | 156/580 X |

FOREIGN PATENT DOCUMENTS

| | | | |
|---|---|---|---|
| 0 652 093 | 11/1994 | European Pat. Off. | |
| 59-142115 | 8/1984 | Japan | 156/344 |
| 63-202409 | 3/1991 | Japan | 156/344 |
| 5-337941 | 12/1993 | Japan | |

*Primary Examiner*—Mark A. Osele
*Attorney, Agent, or Firm*—Smith, Gambrell & Russell, LLP

[57] ABSTRACT

Apparatus is disclosed for removing a coating from synthetic resin products, such as an automobile bumper, to obtain improved coating removal rate and improved productivity. A resin material having a coating applied thereto is rolled between a resin-side roll and a coating-side roll which rotate at different peripheral speeds. A shear stress is applied to the interface between the resin material and the coating, thereby removing the coating from the resin material. Pressing means press the coating-side roll towards the resin-side roll with a predetermined force. The resin-side roll and the coating-side roll apply a normally fixed shear stress between the resin material and the coating, ensuring stable coating removal and improved productivity.

9 Claims, 12 Drawing Sheets

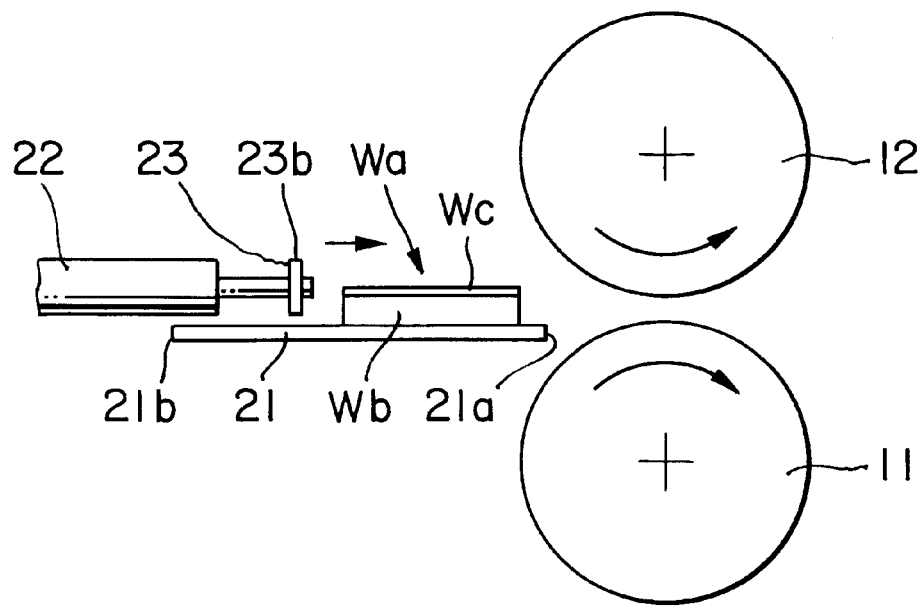
F I G. 5A
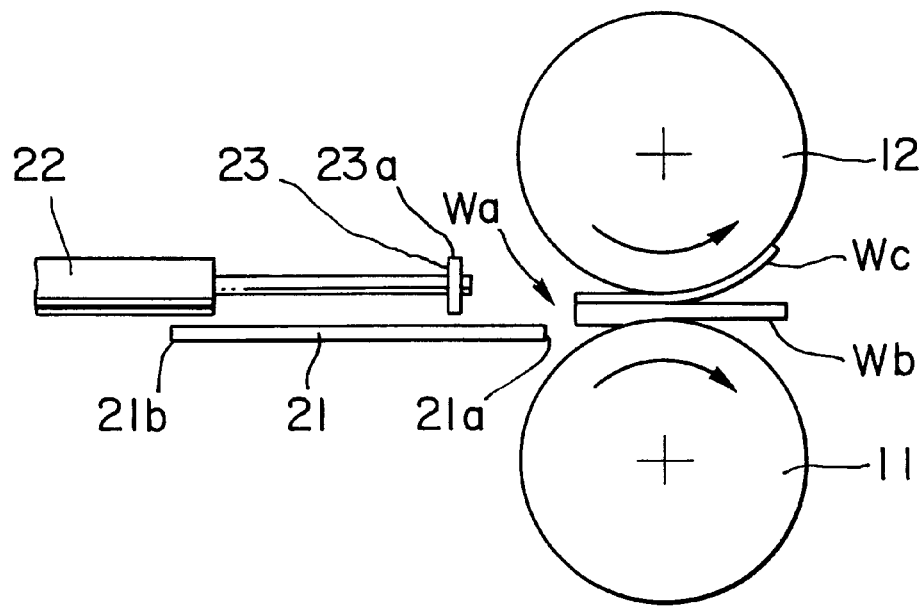
F I G. 5B

APPARATUS FOR REMOVING COATING FROM COATED PRODUCT

BACKGROUND OF THE INVENTION

1. Field of the Invention

The present invention relates to an apparatus for removing a coating from a coated synthetic resin product such as, for instance, a bumper or a side molding which is used as decoration for an automobile or a functional part serving as a buffer, or a CD-ROM or the like.

2. Description of the Related Arts

In recent years, due to rising interest in environmental problems and reuse of resources, the recycling of synthetic resin products has been advocated. For instance, in the automobile industry, attention is being given to the recycling of unusable products produced in the manufacturing process of resin products such as bumpers and side moldings, or the recycling of resin products removed and recovered from scrapped vehicles.

These kinds of resin products such as bumpers and side moldings are often coated in order to improve their external appearance and quality. For instance, in the case of a typical bumper, a film is coated on a resin material consisting of a thermoplastic resin such as a polypropylene resin, via a primer layer of a thermoplastic resin such as a chlorinated polyolefine resin. This coating is a thermosetting resin such as an amino-polyester resin, an amino acrylic resin, a polyester urethane resin or an acrylic urethane resin. Although these resins are liquid prior to curing, a cross-linking structure is formed therein by a baking finish process. Since this structure is strong and hard, the coated resin bumper has superior chemical resistance, heat resistance, abrasion resistance, weather resistance and surface glossiness.

However, when this coated bumper is directly crushed for reuse, the polypropylene resin material serving as the base material of the resin product becomes contaminated with coating pieces. When such a polypropylene resin material contaminated with the coating pieces is molded, the fluidity of the molten resin is inhibited by the presence of the coating pieces, with the result that molding defects such as "burning", "weld marks" and "air bubbles" may occur in the resin product, and the coating pieces rising to the surface of the resin product may spoil the external appearance of the resin product.

Furthermore, although the coating pieces are thermosetting resin, the polypropylene resin serving as a base resin is a thermoplastic resin. Therefore, there is no appreciable interaction between the coating pieces and the base resin, so that kneading of the regenerated recycled resin is inhibited by the coating pieces which have not been minutely dispersed, with the consequence that the mechanical property of the recycled resin product notably deteriorates and the application range of the recycle resin product is greatly restricted.

It is therefore necessary to remove the coating when recycling the coated resin product. An apparatus for removing a coating from a resin product is disclosed in Japanese Patent Laid-Open No. 5-337941, which proposes a removing apparatus for the surface of a synthetic resin product as illustrated in FIG. 16.

In this removing apparatus, a resin product, such as a side molding 102, is carried by a pair of conveying rollers 101 between rolls 103 and 104 which are made from a synthetic resin foam. The carrying speed V of the side molding 102 is set to be lower than the rotational peripheral speed of the rolls 103 and 104 so as to apply cutting and high frictional forces to a coating 102a and a double face adhesive tape 102b on the surfaces of the side molding 102, thereby cutting and removing the coating 102a and the pressure sensitive double face adhesive tape 102b. The side molding 102 is thus delivered outside the system by means of the pair of conveying rollers 101.

However, in this apparatus, a resin product is brought into contact with rolls 103 and 104 which are made of a foamed resin, so that the rolls 103 and 104 are subject to brittle fracture which may generate dust and worsen the working environment. Furthermore, this apparatus is unsuitable for use with bent or curved resin products.

A countermeasure against these problems is disclosed in Japanese Patent Laid-Open Publication No. 7-25664, which illustrates a method for removing a coating from resin material, wherein a resin body having a coating thereon is rolled through a coat removing apparatus, comprising a pair of rolls rotating at different peripheral speeds which are provided facing the coated resin body, and a shear stress is applied between the resin material and the coating thereby removing the coating from the resin material.

In the case of this apparatus, a resin body is rolled between rolls having different peripheral speeds which are provided facing the resin body, and a shear stress is applied to the interface between the resin body and the coating thereby removing and removing the coating from the resin material. For this reason the coating removal rate is high. Furthermore, there is no toxicity since no solvents or the like need be used, and consequently this method has superior environmental safety.

However, when the resin bodies from which coating is to be removed differ in thickness, the size of the gap between the rolls must be adjusted in accordance with the thickness of the resin bodies in order to apply a suitable shear stress to the resin material. Furthermore, when the parts of the same resin body have different thickness, it is difficult to apply a uniform shear stress to the entire surface of the coating, which is likely to reduce coating removal efficiency.

SUMMARY OF THE INVENTION

The present invention provides an apparatus for removing a coating from resin bodies, comprising rolls rotating at different peripheral speeds from each other, and allowing a coated resin body to pass between the rolls while applying a shear stress to the interface between the resin body and the coating, and capable of automatically applying a uniform pressing force even in the cases when the coated resin bodies have different thicknesses or an individual coated resin body has parts with different thicknesses, thereby raising the efficiency for removing the coating and improving productivity.

In order to achieve the above object, a coating removing apparatus of the present invention comprises two rolls with a roll gap therebetween, the rolls being provided in parallel to allow a synthetic resin body having a coating thereon to pass between the roll gap; roll drive means for rotating a coating side roll of the two rolls, the coating side roll contacting the coating, at a different peripheral speed and in a different direction from another synthetic resin body side roll of the two rolls, and causing a shear stress between the coating and the synthetic resin body passing through the roll gap, thereby removing the coating; and pressing means for applying a predetermined force to the rolls so as to force them closer together.

Since the pressing means applies a predetermined force to the rolls, forcing them closer together, a uniform pressing force can be applied to the entire surface and a uniform shear stress can be applied between the resin material and the coating, even when coated resin bodies from which coatings are to be removed have different thicknesses or when an individual coated resin body has parts with different thicknesses, thereby making it possible to raise coating removal efficiency and improve productivity.

BRIEF DESCRIPTION OF THE DRAWINGS

In the drawings:

FIGS. 5A and 5B are views explaining the operation of the coating removing apparatus, FIG. 5A showing a state when the pressing plate is positioned at a rear end position, and FIG. 5B showing a state when the pressing plate is positioned at a front end position;

DESCRIPTION OF THE PREFERRED EMBODIMENTS

Figure 1A:
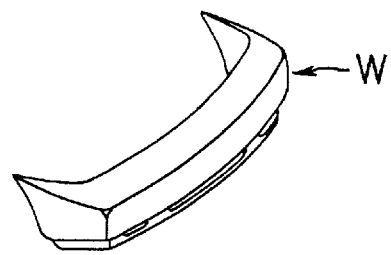
FIG. 1A to FIG. 1F are explanatory views sequentially showing the steps of a method for recycling coated resin products used in the coating removing apparatus of the present invention.
Figure 1B:
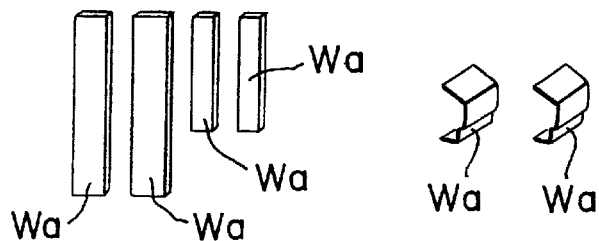

Referring now to the drawings, the preferred embodiments of a coating removing apparatus according to the present invention will be described, taking as an example the collection and recycling of a coated resin bumper, which is a relatively large automobile component.

FIGS. 1A–1F are explanatory views illustrating steps of a method of recycling a synthetic resin product used in the present embodiment of the coating removing apparatus.

This recycling method will next be explained. In a synthetic resin product recovery step shown in FIG. 1A, a bumper W is recovered from defective products during the manufacture and assembly of a synthetic resin bumper or from a scrapped vehicle or the like, and the metal portions of the bumper W are removed. If necessary, in a subsequent resin product cutting step shown in FIG. 1B, the bumper W is cut to be divided into synthetic resin members Wa having a predetermined width.

Next, in a coating removing step shown in FIG. 1C, the coating Wc of the resin member Wa is peeled and removed from the resin material Wb by means of a coating removing apparatus to be described below.

Figure 1C:
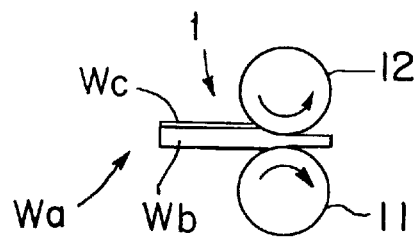
Figure 1D:
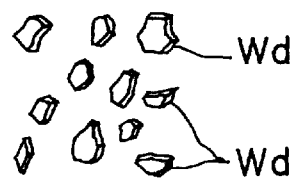

The resin material Wb obtained by removing and removing the coating Wc in the coating removing step in FIG. 1C is crushed by means of a shredder or the like to obtain crushed materials Wd in a subsequent crushing step shown in FIG. 1D.

Figure 1E:
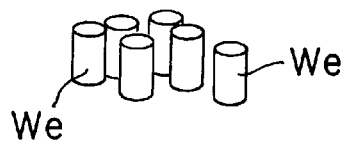

Then, in a pelletizing step shown in FIG. 1E, the crushed materials Wd are supplied to, for instance, an extruder. In the extruder, the crushed materials Wd fed to a hopper are moved forward within a heating cylinder by the rotation of a screw, and are heated therein by means of a heater or the like. While the crushed materials Wd are moved forward in the heating cylinder, they are melted and extruded from a die to produce pellets We having a fixed shape.

Figure 1F:
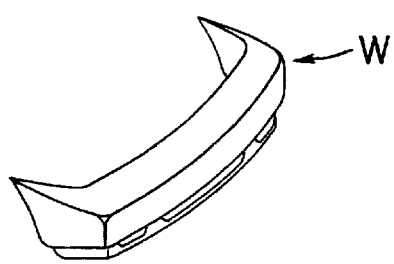

Then, in a molding step shown in FIG. 1F, a resin product such as a bumper W is remolded, after adding pellets of a virgin polypropylene resin to the pellets We obtained in the pelletizing step of FIG. 1E.

Although, in the above explanation, the crushed materials Wd were processed so as to form pellets in the pelletizing step of FIG. 1E, this pelletizing step can be omitted if the crushed materials Wd are finely crushed.

Next, the coating removing apparatus which peels and removes the coating Wc from the resin material Wb in the coating removing step of FIG. 1C will be explained with reference to FIG. 2–FIG. 9.

Figure 2:
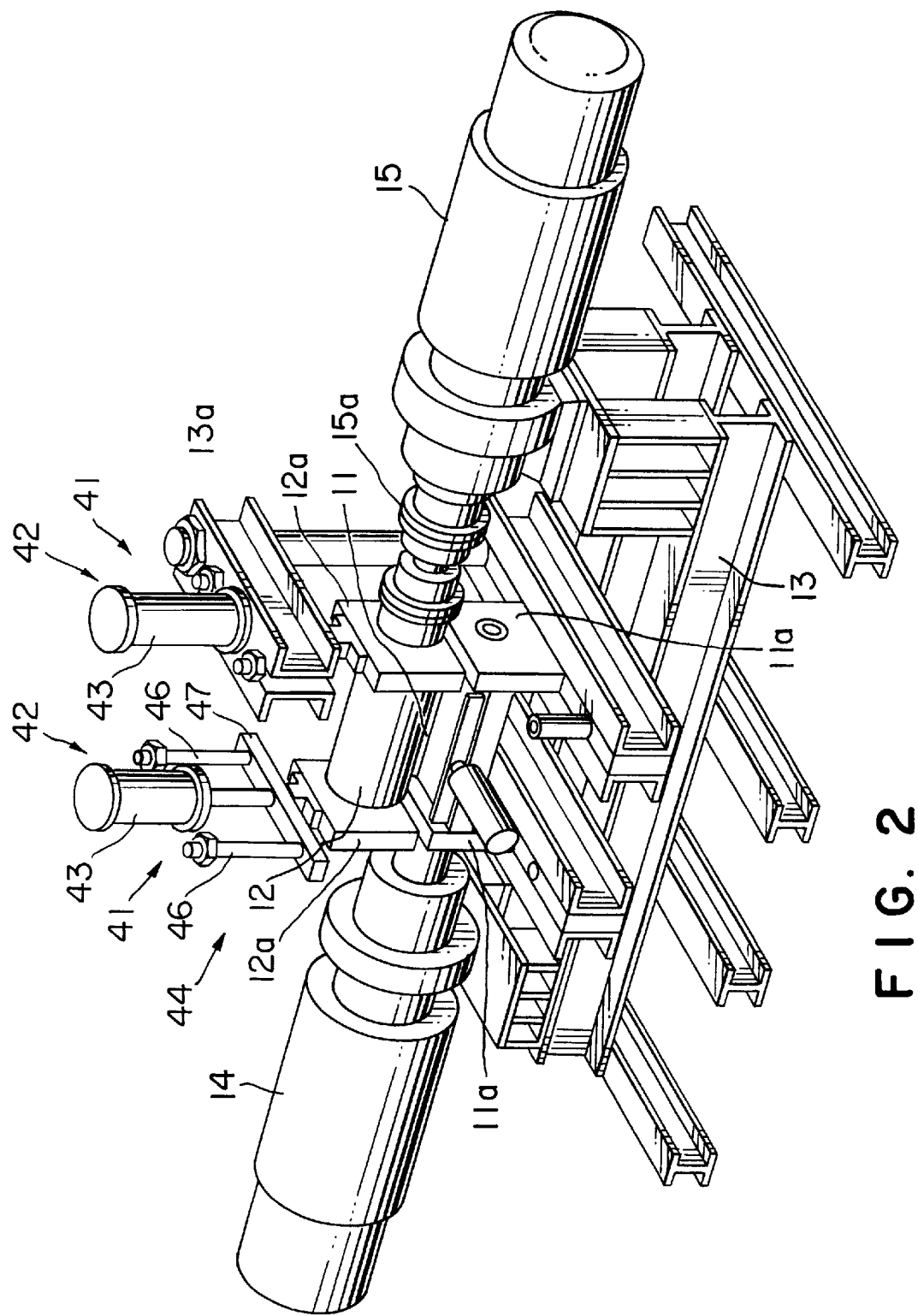
FIG. 2 is a perspective view of the principal parts of one embodiment of the coating removing apparatus of the present invention.
Figure 3:
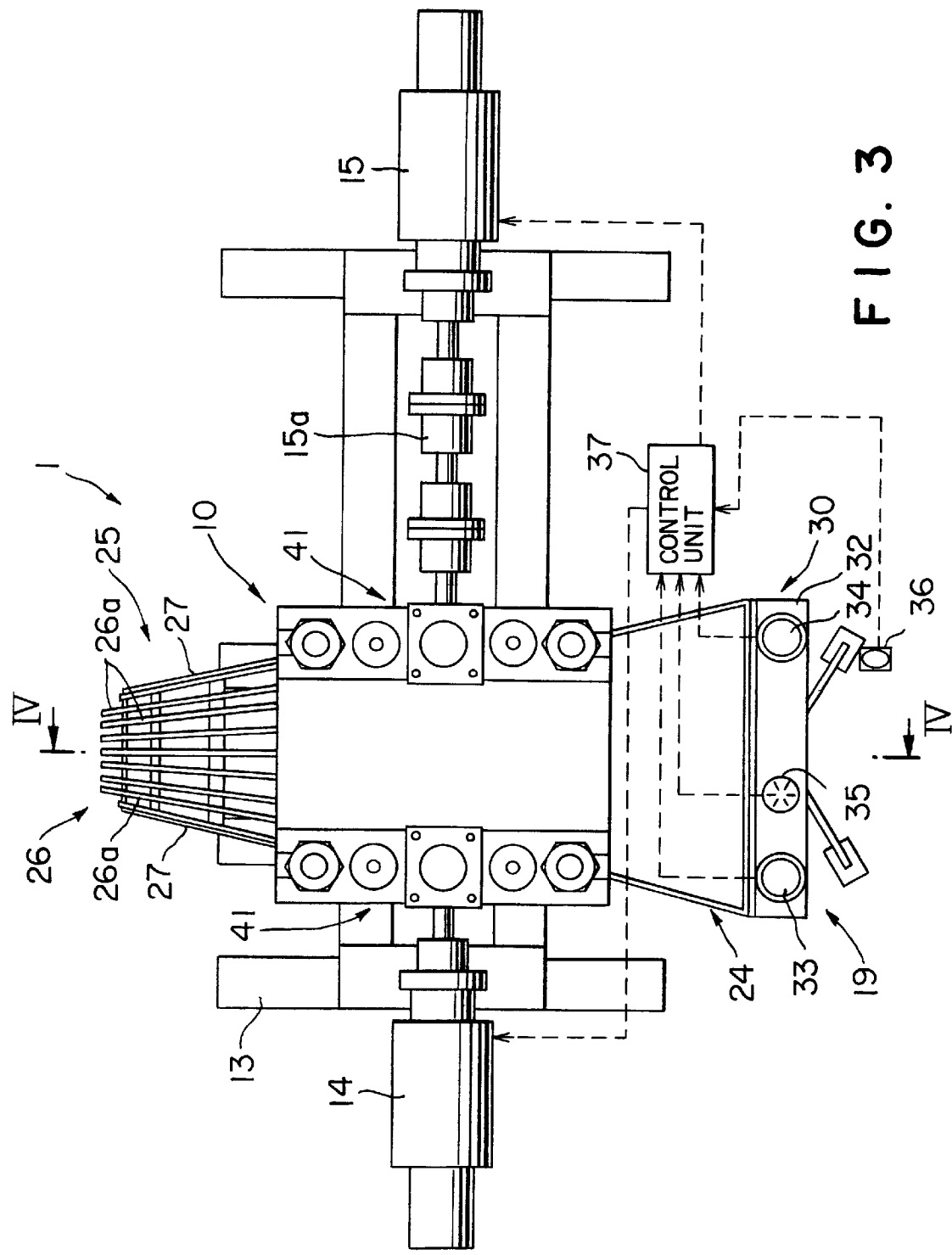
FIG. 3 is an comprehensive front view of the coating removing apparatus.
Figure 4:
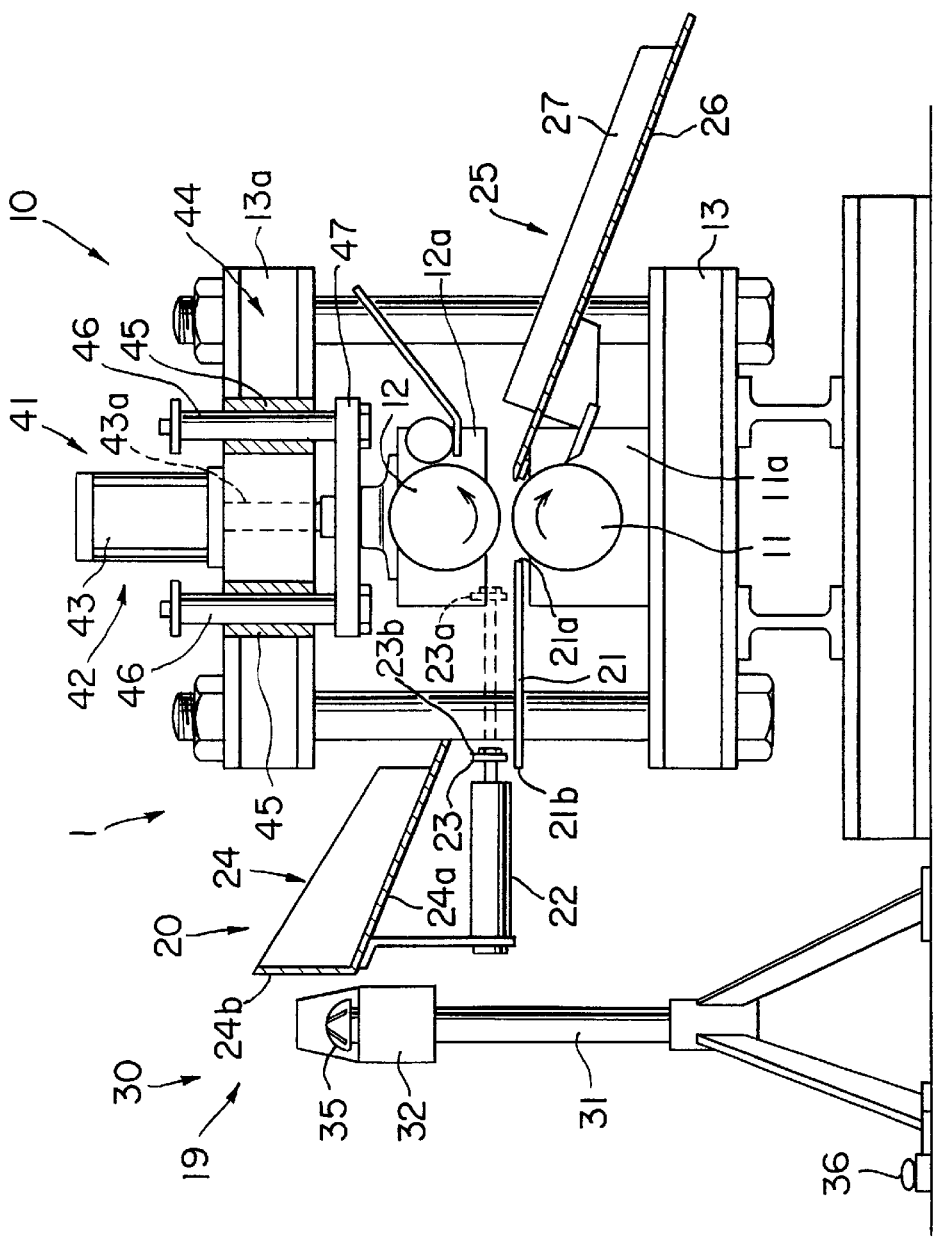
FIG. 4 is a sectional view taken on line IV—IV of FIG. 3.

As the front view of FIG. 3 shows, the coating removing apparatus 1 comprises a removing unit 10 and an operation portion 30. FIG. 2 is a perspective view of the principal parts of the removing unit 10. FIG. 4 is a sectional view taken on the line IV—IV of FIG. 3.

As FIG. 4 shows, the removing unit 10 has a resin-side roll 11 and a coating-side roll 12 which face each other from above and below. The resin-side roll 11 and the coating-side roll 12 are made of metal and their surfaces are processed by a mirror surface finish or chrome plating. The roll 11 is rotatably supported between a pair of roll supporting members 11a which are provided on a supporting frame 13. The roll 11 is rotated by drive unit 14 (FIGS. 2 and 3) such as a motor with a reduction gear.

The coating-side roll 12 is rotatably supported between a pair of coating-side roll supporting members 12a which are supported on the supporting frame 13 by means of pressing means 41 described below so as to be capable of moving upwards and downwards. The roll 12 is rotated by a drive unit 15, such as a motor with a reduction gear, which is connected to the roll 12 via a universal coupling 15a (FIGS. 2 and 3).

The rolls 11 and 12 are rotated at different peripheral speeds. The peripheral speed of the coating-side roll 12 to be in contact with the surface of the coating Wc is higher than the peripheral speed of the resin-side roll 11 to be in contact with the surface of the resin material Wb. Further, the rolls 11 and 12 are rotated in opposite directions so that the resin member Wa is gripped therebetween and a pressing force is applied to the resin member Wa fed between the rolls 11 and 12.

As FIG. 4 shows, the removing unit 10 further comprises a work supply unit 20 constituting a safety unit 19 together with the operation portion 30 explained below, and a delivery unit 25 for conveying the resin material Wb from which the coating Wc has been peeled.

The work supply unit 20 has a flat plate section 21 and a pressing plate section 23. The front edge 21a of the flat plate section 21 is positioned next to the resin-side roll 11, substantially horizontally and at a height substantially corresponding to the gap between the resin-side roll 11 and the coating-side roll 12 which face one another. Furthermore, the pressing plate section 23 is driven by a pressing plate drive unit 22, for example, a pneumatic cylinder, which is provided at the rear edge 21b of the flat plate section 21. With extending and contracting operation of the pneumatic cylinder 22, the pressing plate section 23 moves along the upper surface of the flat plate section 21 backwards and forwards between a front end position 23a near the resin-side roll 11 and a rear end position 23b receding from the resin-side roll 11.

A charging section 24 is located above the pneumatic cylinder 22 provided at the rear edge 21b of the flat plate section 21. The charging section 24 comprises a slope 24a which descends as it approaches the vicinity of the resin-side roll 11, and a flange 24b which rises up along the side edges and the back edge of the slope and is U-shaped when viewed from above.

The resin member Wa inserted above the slope 24a of the charging section 24 slides down the slope 24a onto the flat plate section 21. Then, the extension of the pneumatic cylinder 22 moves the pressing plate section 23 forward from the rear end position 23b as shown in FIG. 5A to the front end position 23a shown in FIG. 5B, thereby pressing the resin member Wa into a gap between the resin-side roll 11 and the coating-side roll 12.

In addition, a delivery unit 25 is provided on the opposite side of the resin-side roll 11 and the coating-side roll 12 from the work supply unit 20. The delivery unit 25 has a bottom portion 26, having a plurality of guiding rods 26a (FIG. 3) whose upper ends are positioned in the vicinity of the surface of the resin-side roll 11 and which slope downwards as they recedes away from the resin-side roll 11 to extend outside the removing unit 10. The delivery unit 25 also has guide members 27 arranged on both sides of the bottom portion 26. The resin material Wb slides over the bottom portion 26 and is delivered therefrom.

The operation portion 30 which is provided in the vicinity of the charging section 24 of the removing unit 10 has a supporting frame 31 and a control box 32 supported by the supporting frame 31. First and second actuating switches 33 and 34 are provided separate from each other on the upper surface of the control box 32, and a first emergency stop switch 35 is provided between the actuating switches 33 and 34. In addition, a second emergency stop switch 36, provided at the bottom of the supporting frame 31, is operated by the operator by means of, for instance, a pedal.

Furthermore, as FIG. 3 shows, a control unit 37 is provided in the control box 32 of the operation portion 30 or to the removing unit 10. The control unit 37 controls the drive units 14 and 15 and the pneumatic cylinder 22 responsive to operation of the first and second actuating switches 33 and 34 and the first and second emergency stop switches 35 and 36.

Next, the operation of the switches 33, 34, 35, and 36, and the drive units 14 and 15, and the pneumatic cylinder 22 will be explained based on the block diagram shown in FIG. 6.

The control unit 37 comprises a drive signal generating section 38 and a stop signal generating section 39. Responsive to a pressing operation of the first actuating switch 33 and the second actuating switch 34 in the control box 32 by the operator, signals from the first and second switches 33 and 34 are input to the drive signal generating section 38. While the pressing operation is continuing, drive units 14 and 15 are operated based on an operational signal from the drive signal generating section 38. In addition, the pneumatic cylinder 22 extends, thereby moving pressing plate 23 from the rear end position 23b to the front end position 23a.

Then, when the operator stops the pressing operation of either one or both of the first and second actuating switches 33 and 34, in other words, when either of the actuating switches 33 and 34 is switched OFF, the drive signal generating section 38 sends a stop signal to the stop signal generating section 39. The drive units 14 and 15 and the pneumatic cylinder 22 then stop their operations responsive to a stop signal from the stop signal generating section 39, and the pneumatic cylinder 22 contracts and returns the pressing plate 23 to the rear end position 23b.

Furthermore, during the operation of the first and second actuating switches 33 and 34, when the second emergency stop switch 36 is turned ON in accordance with the pressing action or pedal action of the first emergency stop switch 35, the second emergency stop switch 36 sends a signal to the stop signal generating section 39. When the stop signal generating section 39 outputs a stop signal, the drive units 14 and 15 stop operating responsive thereto, thereby contracting the pneumatic cylinder 22 and returning the pressing plate 23 to the rear end position 23b. In addition, a warning lamp 40 or the like draws attention to this fact.

The stop signal from the stop signal generating section 39 is given priority over the operation signal from the drive signal generating section 38. In the case when the first and second actuating switches 33 and 34 are both ON, the first or the second emergency stop switches 35 or 36 are used to stop the operation of the drive units 14 and 15, ensuring that the pressing plate 23 returns to the rear end position 23b in accordance with the contraction of the pneumatic cylinder 22.

The pressing means 41 supports the coating-side roll 12 so that the roll 12 is able to move upwards and downwards. The pressing means 41 have a driving portion 42, comprising a pair of pneumatic cylinders 43 which have piston rod members 43a extending downwards, which are provided to supporting frames 13a above the supporting frame 13. The pressing means 41 further have a pair of sleeves 45 provided to the supporting frame 13a on either side of each of the pneumatic cylinders 43, guiding members 46, which are inserted into the sleeves 45 and are guided upwards and downwards, and supporting members 47 which lie along the bottoms of the guiding members 46. The coating-side roll supporting members 12a are provided to the supporting members 47, and the ends of the piston rod members 43a are connected to the supporting members 47.

Figure 7:
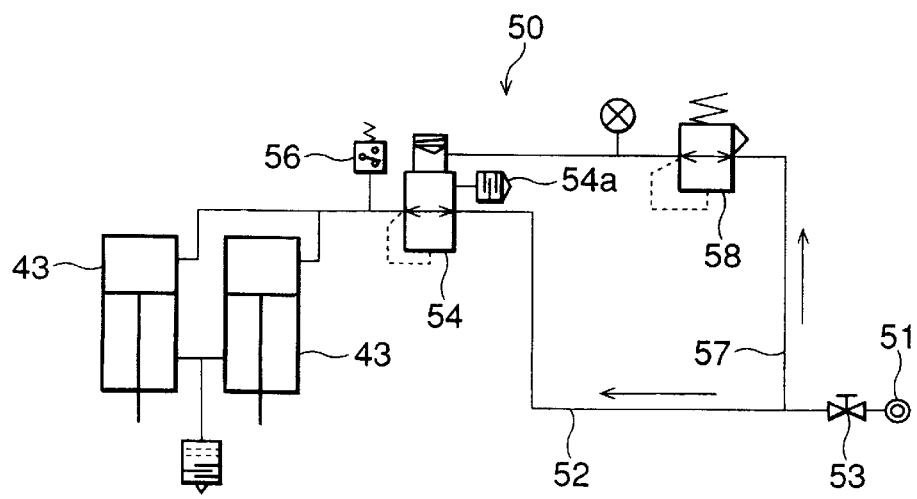
FIG. 7 is a view of an air supply circuit used in the coating removing apparatus.

Then, the coating-side roll 12 is pressingly forced towards the resin-side roll 11 with a predetermined pressure using the piston rod members 43a and the coating-side roll supporting members 12a and so on, which are driven by air pressure supplied to the pneumatic cylinders 43 of the driving portion 42 from an air supply source 51 via the air supply circuit 50 shown in FIG. 7.

As shown in FIG. 7, the air supply circuit 50 has a main line 52, which connects the air supply source 51 to the pneumatic cylinders 43 via a main valve 53, a pressure adjustment valve 54 and a pressure switch 56. In addition, the air supply circuit 50 has a pilot line 57 which branches from the main line 52 between the main valve 53 and the pressure adjustment valve 54 in order to supply a pilot pressure to the pressure adjustment valve 54 via a regulator 58.

When the main valve 53 is opened, the pressure of the air fed to the pilot line 57 from the air supply source 51 is adjusted by the regulator 58 to a required air pressure, namely an air pressure which must be supplied to the pneumatic cylinders 43 in order to apply a shear stress between the resin material Wb and the coating Wc of the resin member Wa. After pressure adjustment by the regulator 58, the air is supplied to the pressure adjustment valve 54 as the pilot pressure.

Air fed from the air supply source 51 to the pressure adjustment valve 54 via the main line 52 is adjusted in accordance with the pilot pressure adjusted by the regulator 58, and is supplied to the pneumatic cylinders 43. In addition, in the case when the air pressure in the pneumatic cylinders 43 exceeds the pilot pressure, the air pressure in the pneumatic cylinders 43 is maintained at a fixed pressure corresponding to the pilot pressure by discharging excess air from a silencer 54a provided to the pressure adjustment valve 54.

Furthermore, when the pressure supplied by the pressure adjustment valve 54 to the pneumatic cylinders 43 is equal to the required air pressure, in other words, when the pressure in the pneumatic cylinders 43 has reached the required air pressure, the pressure switch 56 provided to the main line 52 between the pressure adjustment valve 54 and the pneumatic cylinders 43 switches ON. As FIG. 6 shows, when the pressure switch 56 inputs a signal to the drive signal generating section 38 of the control unit 37, the first actuating switch 33 and the second actuating switch 34 can actuate the drive units 14 and 15.

Therefore, with the air pressures of the pneumatic cylinders 43 maintained at a fixed pressure, adjusted by the pressure adjustment valve 54 in compliance with a pilot pressure set by the regulator 58, the pneumatic cylinders 43 apply a pressing force to the coating-side roll 12, pressing the roll onto the resin-side roll 11. As a result, the resin member Wa which is fed between the rolls 11 and 12 is rolled with a fixed pressing force, so that even in the cases when the resin bodies have different thicknesses or an individual resin body has parts with different thicknesses, it is possible to apply a suitable shear stress over the complete range of the portion between the resin material Wb and the coating Wc.

The operation of the coating removing apparatus 1 having the configuration described above will be described with reference to the control circuit chart in FIG. 8.

First, the operator opens the main valve 53 provided to the air supply circuit 50. When the main valve 53 is opened, pilot pressure adjusted by the regulator 58 is fed to the pressure adjustment valve 54, and air pressure adjusted by the pressure adjustment valve 54 is supplied via the main line 52 to the pneumatic cylinders 43 of the drive unit 42.

Figure 6:
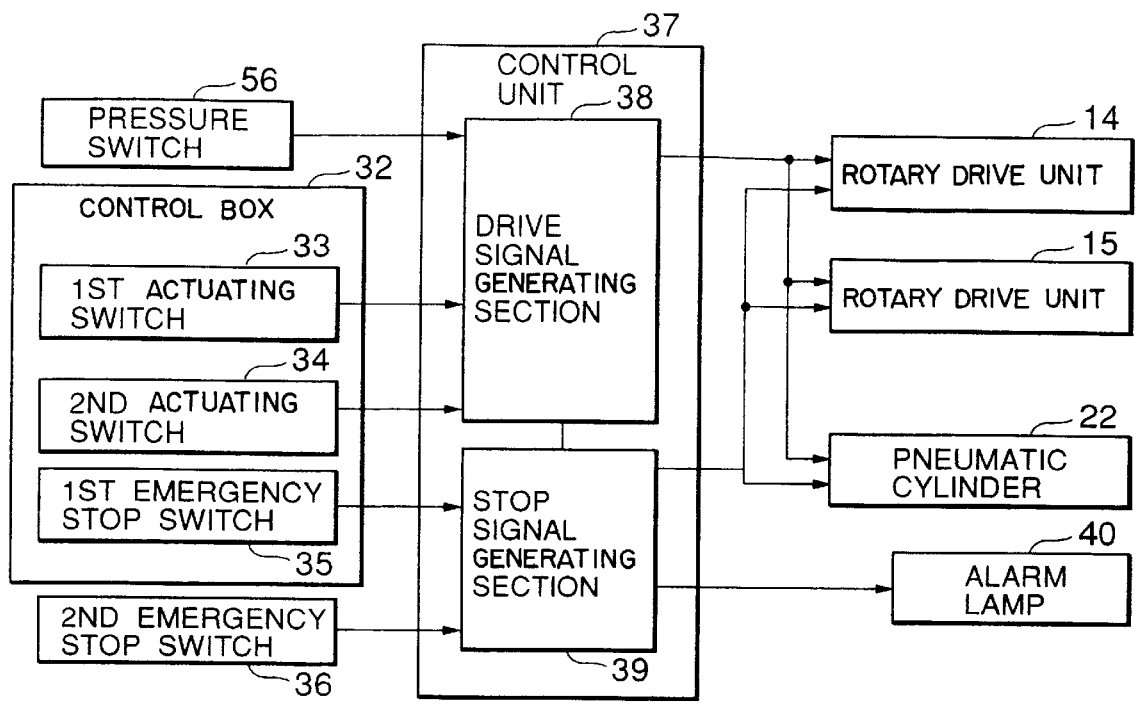
FIG. 6 is a block diagram for explaining a control unit used in the coating removing apparatus.

Then, when the air pressure supplied inside the pneumatic cylinders 43 reaches a required air pressure, the pressure switch 56 switches ON and sends a signal to the drive signal generating section 38 in the control unit 37 shown in FIG. 6, thereby enabling the first actuating switch 33 and the second actuating switch 34 to actuate the drive units 14 and 15, and maintaining fixed air pressure in the pneumatic cylinders 43 in a standby state.

Then, the operator inserts the resin member Wa on the slope 24a of the charging section 24 of the removing unit 10, with the coating Wc facing upwards.

The inserted resin member Wa slides down the slope 24a and is fed on the flat plate section 21 as shown in FIG. 5A, from where it is fed between the rolls 11 and 12. At this time, the pressing plate section 23 is retracted to the rear end position 23b in the vicinity of the rear edge of the flat plate section 21. Therefore, the operator is able to visually confirm the state of the resin member Wa fed onto the flat plate section 21 by viewing the apparatus from behind the slope 24a.

After the resin member Wa has been fed onto the flat plate section 21, the operator presses the first actuating switch 33 and the second actuating switch 34 which are provided on the control box 32 separate from each other. Since this pressing operation is performed on the separated first and second actuating switches 33 and 34, the operation must be performed with both hands. The operator presses the actuating switches 33 and 34 from a position considerably removed from the resin-side roll 11 and the coating-side roll 12.

When the first actuating switch 33 and the second actuating switch 34 are both switched ON, the drive units 14 and 15 become operative in response to an operation signal from the drive signal generating section 38. The resin-side roll 11 and the coating-side roll 12 start to rotate in opposite directions, the coating-side roll 12 rotating at a higher peripheral speed than the resin-side roll 11, and the pneumatic cylinder 22 starts to extend.

As the pneumatic cylinder 22 extends, the pressing plate 23 moves forward from the rear end position 23b and pushes the resin member Wa, which has been fed onto the flat plate section 21, between the resin-side roll 11 and the coating-side roll 12.

The pressing plate 23 pushes the resin member Wa forward, ensuring that the resin member Wa is forced between the resin-side roll 11 and the coating-side roll 12.

Here, the pressure adjustment valve 54 adjusts the air pressure in the pair of pneumatic cylinders 43, which form the pressing means 41, so that the pneumatic cylinders 43 are maintained at a required air pressure in compliance with a pilot pressure adjusted by the regulator 58. As a result, a predetermined pressing force is applied to the coating-side roll 12 by means of the supporting members 47 and the coating-side roll supporting members 12a and so on which are moved up and down by the piston rod member 43a, forcing the coating-side roll 12 towards the resin-side roll 11. Therefore, the resin-side roll 11 and the coating-side roll 12 roll the resin member Wa with a predetermined pressing force. Simultaneous to this, a shear stress is applied by the difference in the peripheral rotating speeds of the rolls 11 and 12 to the interface between the resin material Wb and the coating Wc, whereby the coating Wc is removed from the resin material Wb.

In this rolling process, a normally fixed pressing force is applied to the coating-side roll 12 towards the resin-side roll 11 by means of the pair of pneumatic cylinders 43 in which air pressure is maintained at a fixed pressure. As a consequence, it is possible to apply a predetermined pressing force to the resin members Wa from which coatings are to be removed, even when the resin member Wa have different thicknesses. Therefore, irrespective of the thickness of the resin members Wa, a uniform shear stress can be applied to the interface between the resin material Wb and the coating Wc, enabling the coating Wc to be removed from the resin material Wb under a uniform shear stress.

When the operator releases his hand from either one or both of the first and second actuating switches 33 and 34 at the end of the processing, the direction of the air supplied to the pneumatic cylinder 22 changes. As a result, the pressing plate 23 stops in the front end position 23a and the pneumatic cylinder 22 contracts, thereby moving the pressing plate 23 rearwards to the rear end position 23b.

The rolls 11 and 12 deliver the resin material Wb, from which the coating Wc has been removed, onto the sloping bottom portion 26 of the delivery unit 25. The resin material Wb slides down the top of the bottom portion 26, to be conveyed out of the coating removing apparatus 1 and collected.

After the coating Wc has been removed from the resin material Wb by the motion of the resin-side roll 11 and the coating-side roll 12, when the operator stops pressing the first actuating switch 33 and the second actuating switch 34 by releasing his hands from the switches 33 and 34, the drive units 14 and 15 stop, whereby the rolls 11 and 12 stop rotating.

By repeating the above operation, the coatings Wc are peeled and removed from the resin materials Wb of the resin members Wa in sequence.

During the removing of the coating operated by pressing the first actuating switch 33 and the second actuating switch 34, when the air pressure in the pneumatic cylinders 43 drops below the required air pressure, the pressure switch 56 switches OFF. As shown by dotted chain line a in FIG. 8, when the pressure switch 56 is OFF, the drive signal generating section 38 sends a stop signal to the stop signal generating section 39. As shown by the dotted chain line b in FIG. 8, the drive units 14 and 15 cease operating responsive to the stop signal from the stop signal generating section 39, whereby the resin-side roll 11 and the coating-side roll 12 stop rotating. In addition, the pneumatic cylinder 22 contracts, moving back the pressing plate 23 to stop at the rear end position 23b.

Therefore, in the case where the air pressure in the pneumatic cylinders 43 drops below the required air pressure during the coating removing operation, reducing the pressing force applied to the resin member Wa by the resin-side roll 11 and the coating-side roll 12, namely the shear stress, the coating removing operation is discontinued in order to reliably prevent the coatings from being peeled under an uneven shear stress, thereby preserving a sufficient coating removal rate.

Figure 8:
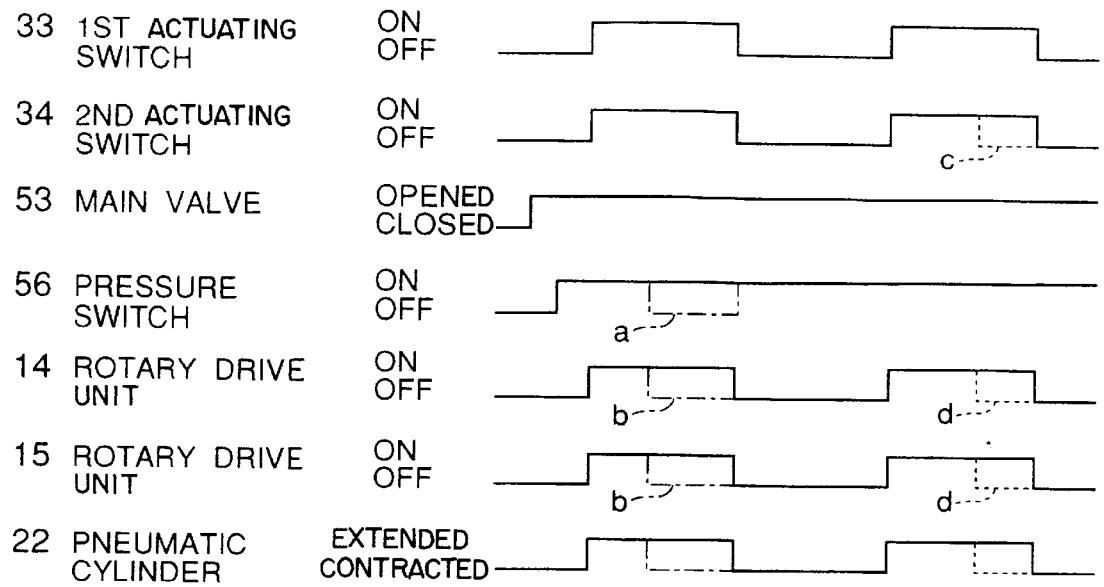
FIG. 8 is a control circuit chart explaining the operation of the coating removing apparatus.

Furthermore, during the removing of the coating operated by pressing the first actuating switch 33 and the second actuating switch 34, when the operator releases his hand from either one or both of the actuating switches 33 and 34, in other words when at least either one of the first and second actuating switches 33 and 34 turns OFF, for instance, in the case shown by dashed line c in FIG. 8 in which the second actuating switch 34 turns OFF, the drive signal generating section 38 inputs a stop signal to the stop signal generating section 39. Then, as shown by dashed line d in FIG. 8, the drive units 14 and 15 stop operating responsive to a stop signal from the stop signal generating section 39, whereby the resin-side roll 11 and the coating-side roll 12 stop rotating. In addition, the pneumatic cylinder 22 contracts, moving back the pressing plate 23 to stop at the rear end position 23b.

Consequently, the resin-side roll 11 and the coating-side roll 12 are rotated only while the operator is pressing both the first actuating switch 33 and the second actuating switch 34. Since the operator necessarily operates the apparatus from a sufficient distance during this period, there is no danger of the operator's hand or the like becoming caught between the rolls 11 and 12. Moreover, work safety is ensured by the fact that in a case when, for some reason or other, the first or second emergency stop switches 35 and 36 are actuated during the coating removing operation, the drive units 14 and 15 stop operating responsive to a stop signal from the stop signal generating section 39, the rolls 11 and 12 stop rotating, and the pneumatic cylinder 22 contracts, thereby moving back the pressing plate 23 to stop at the rear end position 23b.

Figure 9:
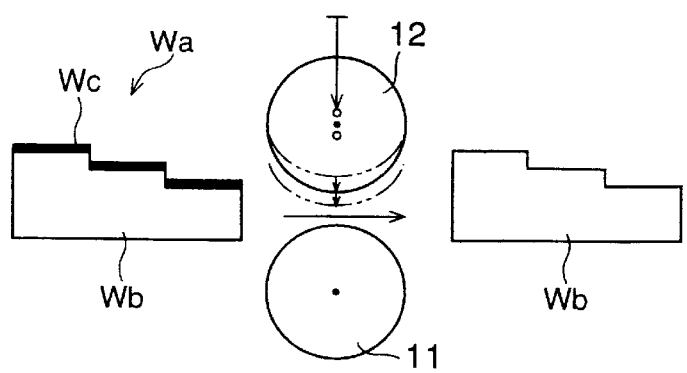
FIG. 9 is an explanatory view showing the action of the coating removing apparatus.

Furthermore, when the resin member Wa has portions of different thicknesses as shown, for instance, in FIG. 9, the coating-side roll 12 is moved upwards and downwards by the guiding members 44 so as to adhere to the changes in the thickness of the resin member Wa. In addition, since the pneumatic cylinders 43 apply a normally constant pressing force to the coating-side roll 12 towards the resin-side roll 11, it is possible to apply a normally uniform shear stress between the resin material Wb and the coating Wc, thereby removing the coating Wc from the resin material Wb.

In the above explanation, the pressing means 41 support the coating-side roll 12 so as to be able to move upwards and downwards and apply a pressing force to the resin-side roll 11. However, a configuration is also possible wherein the resin-side roll 11 is supported so as to be able to move upwards and downwards and apply a pressing force to the coating-side roll 12.

Another embodiment of an air supply circuit used in the pressing means 41 will be described with reference to FIG. 10.

This air supply circuit 60 comprises a main line 52, which connects the air supply source 51 to the pneumatic cylinders 43 via a main valve 53, a pressure adjustment valve 54 and a pressure switch 56. The air supply circuit 50 further comprises first pilot lines 61 and 63 having a first regulator 62 and a second regulator 64 for respectively obtaining a first air pressure and a second air pressure which are different, namely different first and second pilot pressures, the first pilot lines 61 and 63 branching from the main line 52 between the main valve 53 and the pressure adjustment valve 54. Furthermore, the air supply circuit 60 comprises a switching valve 65 for selectively switching between the first pilot pressure and the second pilot pressure, which are supplied from the first and second pilot lines 61 and 63, and supplying a pilot pressure to the pressure adjustment valve 54.

When the solenoid of the switching valve 65 is ON, namely in the energized state, a pilot pressure adjusted by the second regulator 64 as the high-pressure pilot pressure is supplied to the pressure adjustment valve 54, with the result that the pneumatic cylinders 43 are set to the high pressure side and consequently apply a large shear stress between the coating Wc and the resin material Wb. Alternatively, when the solenoid of the switching valve 65 is switched OFF, as shown in FIG. 10, a pilot pressure adjusted by the first regulator 62 as the low-pressure pilot pressure is supplied to the pressure adjustment valve 54, with the result that the pneumatic cylinders 43 are set to the low pressure side and consequently apply a small shear stress between the coating Wc and the resin material Wb of the resin member Wa.

Moreover, when the pressure supplied by the pressure adjustment valve 54 to the pneumatic cylinders 43 is a required low air pressure, in other words, when the pressure in the pneumatic cylinders 43 has reached the pilot pressure adjusted by the first regulator 62, the pressure switch 56 provided to the main line 52 between the pressure adjustment valve 54 and the pneumatic cylinders 43 switches ON. As FIG. 6 shows, when the pressure switch 56 inputs a signal to the drive signal generating section 38 of the control unit 37, the first actuating switch 33 and the second actuating switch 34 actuate the drive units 14 and 15.

The operation of the coating removing apparatus 1 having the configuration described above will be explained based on the control circuit chart shown in FIG. 11.

Figure 11:
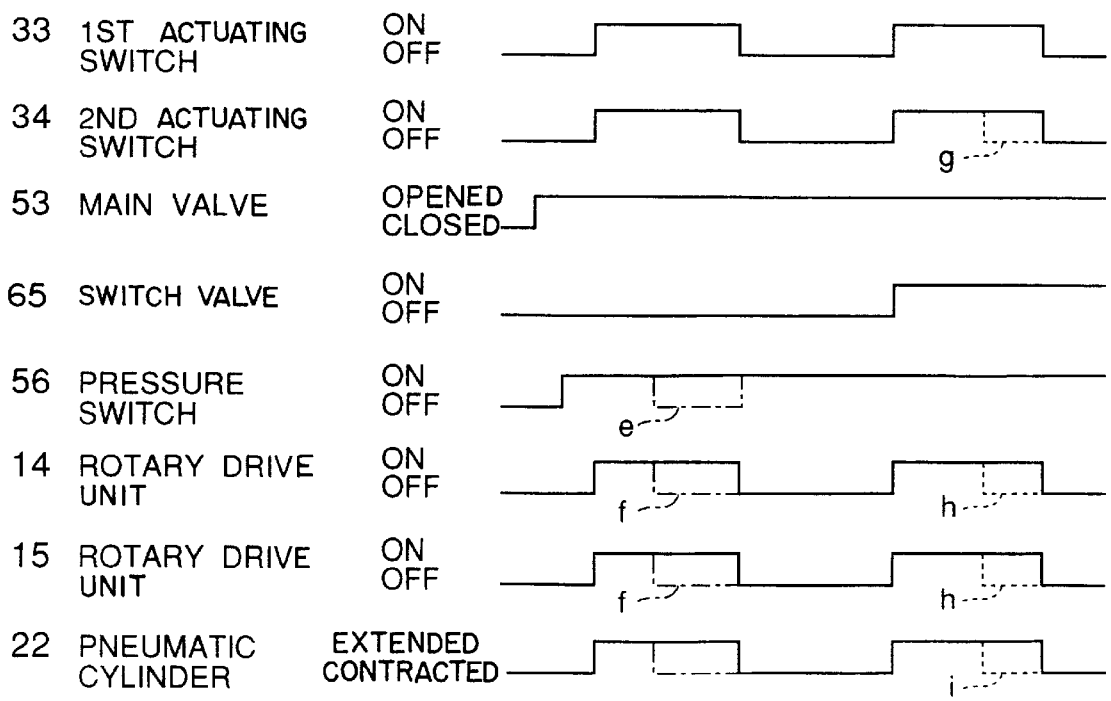
FIG. 11 is a control circuit diagram explaining the action of the coating removing apparatus.

Firstly, as FIG. 11 shows, when the main valve 53 is opened, a low-side pilot pressure adjusted by the first regulator 62 is supplied from the first pilot line 61 via the switching valve 65 to the pressure adjustment valve 54. Then, air pressure adjusted by the pressure adjustment valve 54 is supplied via the main line 52 to the pneumatic cylinders 43 of the drive unit 42.

Then, when the air pressure supplied to the pneumatic cylinders 43 reaches a predetermined air pressure, the pressure switch 56 switches ON and sends a signal to the drive signal generating section 38 in the control unit 37, thereby enabling the first actuating switch 33 and the second actuating switch 34 to actuate the drive units 14 and 15, and maintaining a predetermined air pressure corresponding to the first pilot pressure in the pneumatic cylinders 43 in a standby state.

Then, in the case when the air pressure required for processing the resin member Wa to be processed is low, the resin member Wa is charged into the charged section 24, the first actuating switch 33 and the second actuating switch 34 are switched ON by the pressing described above, and the drive units 14 and 15 become operative in response to an actuation signal from the drive signal generating section 38. In addition, the pneumatic cylinder 22 starts to extend, whereby the pressing plate 23 moves forward and pushes the resin member Wa, which has been fed onto the flat plate section 21, between the rolls 11 and 12.

Here, since the air pressures of the pneumatic cylinders 43 of the pressing means 41 are maintained at a predetermined pressure, adjusted by the pressure adjustment valve 54 in compliance with a pilot pressure set by the first regulator 62, the resin member Wa which is fed between the rolls 11 and 12 is rolled with a fixed pressing force applied thereto. The difference in the peripheral speeds of the resin-side roll 11 and the coating-side roll 12 enables a shear stress to be applied to the portion between the resin material Wb and the coating Wc, removing and removing the coating Wc from the resin material Wb.

Alternatively, in the case when the air pressure required for processing the resin member Wa to be processed is high, the solenoid of the switching valve 65 is set ON, whereby a second pilot pressure which has been adjusted by the second regulator 64 is supplied to the pressure adjustment valve 54. Thus the pneumatic cylinders 43 of the pressing means 41 are maintained at an air pressure which has been adjusted by the pressure adjustment valve 54 in compliance with the second pilot pressure.

Therefore, when the resin member Wa is charged at the charging section 24 and the first actuating switch 33 and the second actuating switch 34 are set to ON by means of the pressing operation, the drive units 14 and 15 become operative in response to an actuation signal from the drive signal generating section 38. In addition, the pneumatic cylinder 22 is actuated, whereby the pressing plate 23 moves forward and pushes the resin member Wa, which has been fed onto the flat plate section 21, between the rolls 11 and 12. Thus the resin member Wa is fed between the rolls 11 and 12 to be rolled with a fixed pressing force. The difference in the peripheral speeds of the rolls 11 and 12 enables a shear stress to be applied to the portion between the resin material Wb and the coating Wc, removing and removing the coating Wc from the resin material Wb.

During the removing of the coating operated by pressing the first actuating switch 33 and the second actuating switch 34, when the air pressure in the pneumatic cylinders 43 drops below a predetermined pressure, the pressure switch 56 switches OFF. As shown by dotted chain line e in FIG. 11, when the pressure switch 56 is OFF, the drive signal generating section 38 sends a stop signal to the stop signal generating section 39. As shown by the dotted chain line f in FIG. 11, the drive units 14 and 15 cease operating responsive to the stop signal from the stop signal generating section 39, whereby the rolls 11 and 12 stop rotating. In addition, the pneumatic cylinder 22 contracts, moving back the pressing plate 23 to stop at the rear end position 23b.

Therefore, when the air pressure in the pneumatic cylinders 43 drops below the required air pressure, the coating removing operation is discontinued in order to prevent a reduction in the coating removal rate.

During the removing of the coating operated by pressing the first actuating switch 33 and the second actuating switch 34, when the operator releases his hand from at least one of the first and second actuating switches 33 and 34, in other words when either of the actuating switches 34 and 34 turns OFF, for instance, in the case shown by dashed line g in FIG. 11 in which the second actuating switch 34 turns OFF, the drive signal generating section 38 inputs a stop signal to the stop signal generating section 39. Then, as shown by dashed line h in FIG. 11, the drive units 14 and 15 stop operating responsive to a stop signal from the stop signal generating section 39, whereby the rolls 11 and 12 stop rotating. In addition, as shown by dashed line i in FIG. 11, the pneumatic cylinder 22 contracts, thereby moving back the pressing plate 23 to stop at the rear end position 23b. Furthermore, work safety is ensured by the fact that in a case when, for some reason or other, the first or second emergency stop switches 35 or 36 are actuated during the coating removing operation, the drive units 14 and 15 stop operating responsive to a stop signal from the stop signal generating section 39, the rolls 11 and 12 stop rotating, and the pneumatic cylinder 22 contracts, thereby moving back the pressing plate 23 to stop at the rear end position 23b.

In the embodiments described above, the pressing means 41 were controlled by means of air pressure supplied to the pneumatic cylinders 43 of the driving portion 42, but the pressing means 41 can be controlled hydraulically. An embodiment of the present invention in which the pressing means 41 are hydraulically controlled will be explained.

Figure 12:
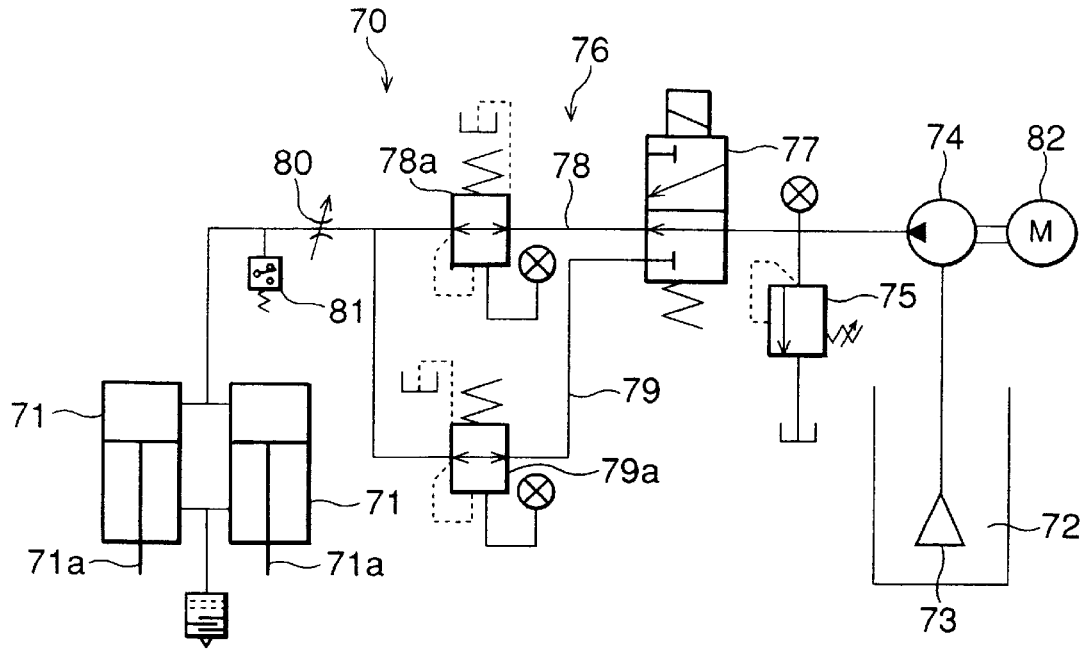
FIG. 12 is a view of a hydraulic supply circuit used in the coating removing apparatus.

FIG. 12 shows a hydraulic supply circuit 70 used in the pressing means 41. In the diagram, 71 is a pair of hydraulic cylinders, which are provided to the supporting frame 13 instead of the pneumatic cylinders 43. The piston rod members 71a on the tip of the hydraulic cylinders 71 are joined to the supporting members 47.

The hydraulic supply circuit 70 supplies oil from an actuating oil supply source 72, such as an oil reservoir, to the hydraulic cylinders 71.

Provided in sequence from the actuating oil supply source 72 are a hydraulic pump 74 which pumps actuating oil via a strainer 73, a relief valve 75 which controls the pressure of the oil sent by the hydraulic pump 74 to a predetermined value, a hydraulic switch control portion 76 which switches oil pressure sent from the relief valve 75, and a flow rate control valve 80 which controls the amount of oil from the hydraulic switch control portion 76 and supplies it to the hydraulic cylinders 71. Furthermore, a pressure switch 81 which detects the oil pressure in the hydraulic cylinders 71 is provided between the flow rate control valve 80 and the hydraulic cylinders 71. In addition, an electric motor 82 or the like is provided as drive means for driving the hydraulic pump 74.

The hydraulic switch control portion 76 comprises a switch valve 77, a first line 78 which supplies oil pressure from the switch valve 77 via a first pressure reduction valve 78*a* to the flow rate control valve 80, and a second line 79 which supplies oil pressure from the switch valve 77 via a second pressure reduction valve 79*a* to the flow rate control valve 80. When the switch valve 77 is OFF, as shown in FIG. 12, namely when the switch valve 77 is not energized, the oil pressure from the relief valve 75 passes through the first line 78 where it is reduced by the first pressure reduction valve 78*a* and supplied to the flow rate control valve 80. Alternatively, when the switch valve 77 is energized, in other words when the switch valve 77 is switched ON, oil pressure from the relief valve 75 pass through the second line 79 where it is reduced by the second pressure reduction valve 79*a* and supplied to the flow rate control valve 80.

Therefore, when the switch valve 77 is OFF, oil pressure from the hydraulic pump 74, which has been adjusted to a predetermined pressure value by means of the relief valve 75, is supplied to the first line 78, where it is reduced to the low pressure and supplied to the hydraulic cylinders 71, whereby the hydraulic cylinders 71 are adjusted to the low pressure and a small shear stress is resultantly applied to the resin member Wa. Alternatively, when the switch valve 77 is ON, oil pressure which has been adjusted to a predetermined value by the relief valve 75, is supplied to the second line 79, where it is increased to the high pressure by the second pressure reduction valve 79*a* and supplied to the hydraulic cylinders 71, whereby the hydraulic cylinders 71 are adjusted to the high pressure and a large shear stress is resultantly applied to the resin member Wa.

Moreover, when the oil pressure in the hydraulic cylinders 71 has reached the required oil pressure, in other words the oil pressure adjusted by the first pressure reduction valve 78*a*, the pressure switch 81 switches ON and inputs a signal to the drive signal generating section 38 of the control unit 37 shown in FIG. 6, whereby the first actuating switch 33 and the second actuating switch 34 actuate the drive units 14 and 15.

Next, the operation of the coating removing apparatus 1 having the above configuration will be explained referring to the control circuit chart shown in FIG. 13.

Figure 13:
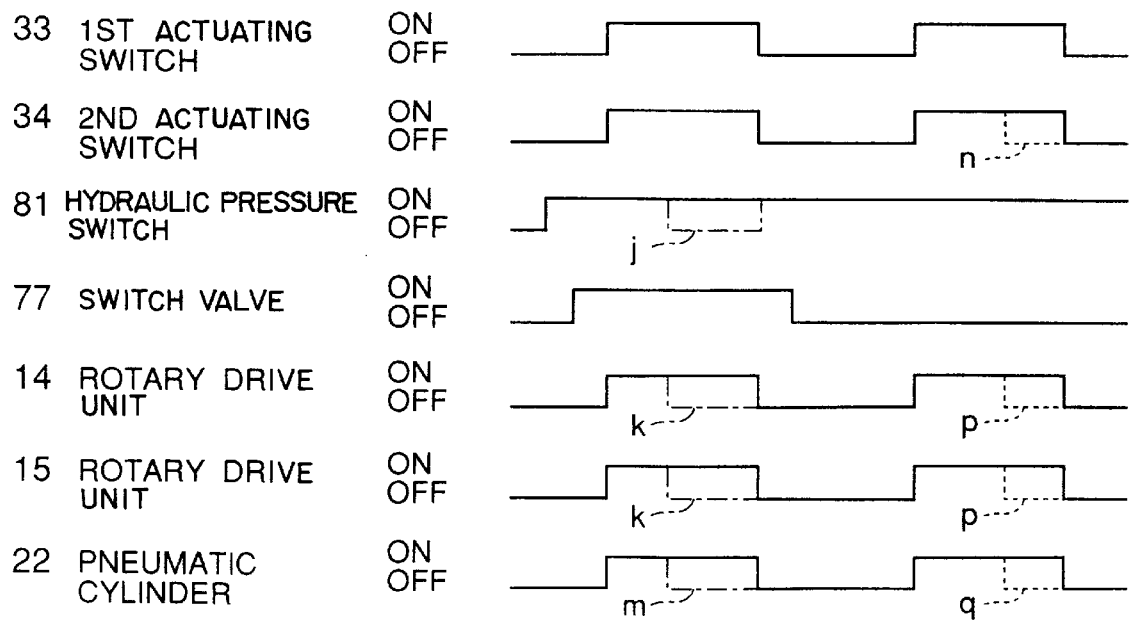
FIG. 13 is a control circuit chart explaining the action of the coating removing apparatus.

Firstly, as FIG. 13 shows, when the hydraulic pump 74 starts to operate, the oil pressure adjusted by the relief valve 75 is supplied via the switch valve 77 to the first pressure reduction valve 78*a*, and oil pressure adjusted to a low pressure by the first pressure reduction valve 78*a* is supplied to the hydraulic cylinders 71 of the drive unit 42.

Then, when the oil pressure supplied to the hydraulic cylinders 71 reaches a predetermined pressure, the pressure switch 81 switches ON and sends a signal to the drive signal generating section 38 of the control unit 37, thereby enabling the first actuating switch 33 and the second actuating switch 34 to actuate the drive units 14 and 15. In addition, the first pressure reduction valve 78*a* maintains a fixed oil pressure in the hydraulic cylinders 71 in the standby state.

In the case when the oil pressure required for processing the resin member Wa to be processed is low, the resin member Wa is inserted into the insert portion 24, the first actuating switch 33 and the second actuating switch 34 are switched ON by the pressing operation described above, and the drive units 14 and 15 become operative in response to an actuate signal from the drive signal generating section 38. In addition, the pneumatic cylinder 22 starts to extend, whereby the pressing plate 23 moves forward and pushes the resin member Wa, which has been fed onto the flat plate section 21, between the rolls 11 and 12.

Here, since the oil pressures of the hydraulic cylinders 71 of the pressing means 41 are maintained at a fixed pressure adjusted by the first pressure reduction valve 78*a*, the resin member Wa which is fed between the rolls 11 and 12 is rolled with a predetermined pressing force applied thereto. The difference in the peripheral speeds of the resin-side roll 11 and the coating-side roll 12 enables a shear stress to be applied to the portion between the resin material Wb and the coating Wc, removing and removing the coating Wc from the resin material Wb.

Alternatively, in the case when the oil pressure required for processing the resin member Wa to be processed is high, the switch valve 77 is switched to ON, and by switching the switch valve 77, an oil pressure which has been adjusted by the second pressure reduction valve 79*a* is supplied to the hydraulic cylinders 71 and maintained at a fixed pressure.

Therefore, when the resin member Wa is charged in the charging section 24 and the first actuating switch 33 and the second actuating switch 34 are set to ON by means of the pressing operation, the drive units 14 and 15 and the pneumatic cylinder 22 are actuated responsive to an actuate signal from the drive signal generating section 38, whereby the pressing plate 23 moves forward and pushes the resin member Wa, which has been fed onto the flat plate section 21, between the rolls 11 and 12. Thus the resin member Wa is rolled between the rolls 11 and 12. In addition, the difference in the peripheral speeds of the resin-side roll 11 and the coating-side roll 12 applies a shear stress to the portion between the resin material Wb and the coating Wc, removing and removing the coating Wc from the resin material Wb.

Here, during the removing of the coating operated by pressing the first actuating switch 33 and the second actuating switch 34, when the oil pressure in the hydraulic cylinders 71 drops below a predetermined pressure, the pressure switch 81 switches OFF. As shown by dotted chain line j in FIG. 13, when the pressure switch 81 is OFF, the drive signal generating section 38 sends a stop signal to the stop signal generating section 39. As shown by dotted chain line k in FIG. 13, the actuation of the drive units 14 and 15 ceases responsive to the stop signal from the stop signal generating section 39, whereby the rolls 11 and 12 stop rotating. In addition, the pneumatic cylinder 22 contracts as shown by dotted chain line m in FIG. 13, moving back the pressing plate 23 to stop at the rear end position 23*b*.

Therefore, when the pressing force between the resin-side roll 11 and the coating-side roll 12 has dropped, the coating removing operation is discontinued in order to prevent a reduction in the coating removal rate.

Furthermore, during the removing of the coating operated by pressing the first actuating switch 33 and the second actuating switch 34, when the operator releases his hand from at least one of the first and second actuating switches 33 and 34, in other words when either of the actuating switches 34 and 34 turns OFF, for instance, in the case shown by dashed line n in FIG. 13 in which the second actuating switch 34 turns OFF, the drive signal generating section 38 inputs a stop signal to the stop signal generating section 39. Then, as shown by dashed line p in FIG. 13, the drive units 14 and 15 stop operating responsive to a stop signal from the stop signal generating section 39, whereby the rolls 11 and 12 stop rotating. In addition, as shown by dashed line q in FIG. 13, the pneumatic cylinder 22 contracts, thereby moving back the pressing plate 23 to stop at the rear end position 23b. Furthermore, work safety is ensured by the fact that in a case when, for some reason or other, the first or second emergency stop switches 35 or 36 are actuated during the coating removing operation, the drive units 14 and 15 stop operating responsive to a stop signal from the stop signal generating section 39, the rolls 11 and 12 stop rotating, and the pneumatic cylinder 22 contracts, thereby moving back the pressing plate 23 to stop at the backward end position 23b.

Figure 14:
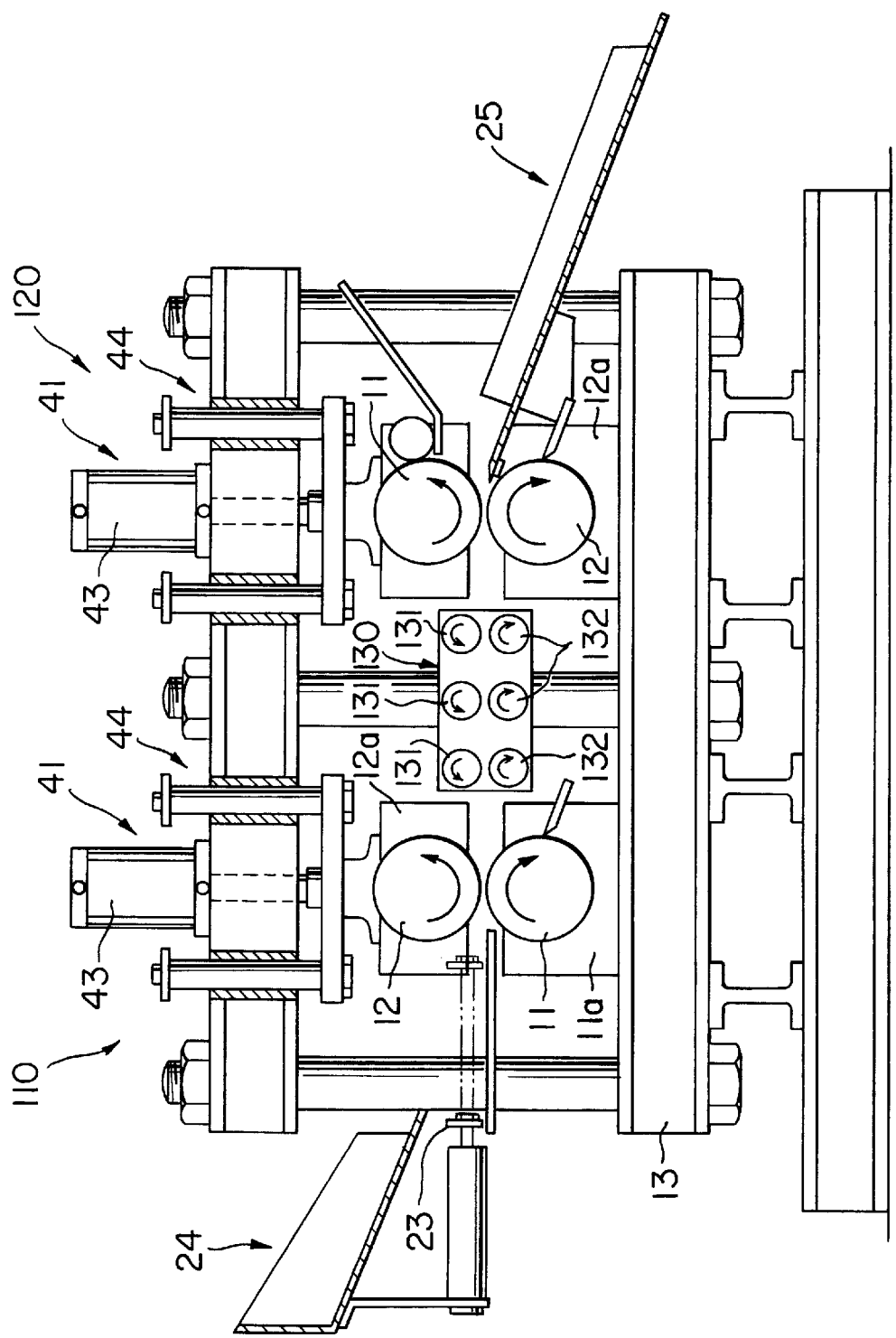
FIG. 14 is a schematic view explaining another embodiment of the coating removing apparatus of the present invention.

Another embodiment of the coating removing apparatus of the present invention will be described based on FIG. 14.

This coating removing apparatus comprises an upper surface coating removing unit 110, a lower surface coating removing unit 120, and a conveying unit 130 provided therebetween.

In the upper coating removing unit 110, resin members Wa charged from the charging section 24 are fed between the resin-side roll 11 and the coating-side roll 12 by the pressing plate 23. The resin-side roll 11 is supported so as to be able to rotate freely between resin-side roll supporting members 11a provided on the supporting frame 13. The coating-side roll 12 is supported by coating-side roll supporting members 12a which, as in the embodiments already described, are supported by pressing force means 41 and guide members 44, so that the resin-side roll 11 and the coating-side roll 12 rotate at different peripheral speeds. For instance, the coating-side roll 12 may rotate at a higher peripheral speed than the resin-side roll 11. In addition, the resin-side roll 11 and the coating-side roll 12 rotate in opposite directions.

Figure 10:
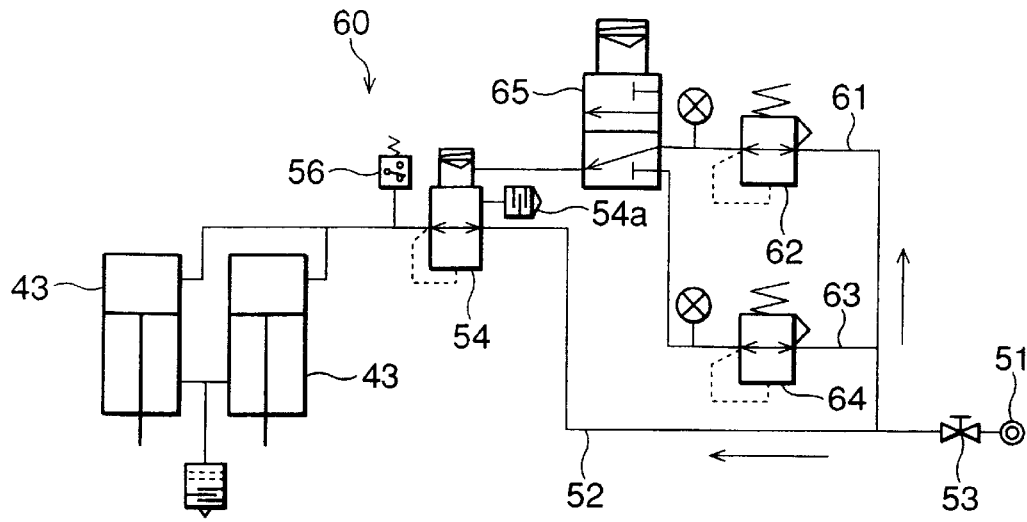
FIG. 10 is a circuit diagram of an air supply circuit used in the coating removing apparatus.

Air is supplied to the pneumatic cylinders 43 by means of the air supply circuits 50 or 70 in FIG. 7 and FIG. 10 described above.

Therefore, the resin member Wa charged from the charging section 24 is rolled between the resin-side roll 11 and the coating-side roll 12, which apply a fixed pressing force. In addition, a suitable shear stress is applied between the resin material Wb and the coating Wc on the upper surface thereof, removing the coating Wc from the resin material Wb.

The resin material Wb, from the upper surface of which the coating Wc has been peeled and removed in the upper surface coating removing unit 110, is conveyed to the lower coating removing unit 120 by the conveying unit 130. This conveying unit 130 has upper rolls 131 and lower rolls 132, which are rotated by a drive unit such as a motor using transmission means such as a chain or a belt or the like. The resin material Wb is gripped between the upper and lower rolls 131 and 132 and is conveyed therethrough.

The lower coating removing unit 120 has a resin-side roll 11 and a coating-side roll 12 which apply a pressing force to the coating on the lower surface of the resin material Wb conveyed by the conveying unit 130. The coating-side roll 12 is supported so as to be able to rotate freely between coating-side roll supporting members 12a which are provided on the supporting frame 13. The resin-side roll 11 is supported by the resin-side roll supporting members 11a which are supported on the supporting frame 13 by pressing force means 41 and guide members 44. The resin-side roll 11 and the coating-side roll 12 rotate at different peripheral speeds and in opposite directions.

Then, as in the upper side coating removing unit 110, air is supplied to the pneumatic cylinders 43 from the air supply circuits 51 or 70 shown in FIGS. 7 and 10.

Therefore, the resin material Wb conveyed by the conveying unit 130 to the lower surface coating removing unit 120 is rolled between the resin-side roll 11 and the coating-side roll 12, which apply a fixed pressing force thereto. In addition, a suitable shear stress is applied between the resin material Wb and the coating Wc on the lower surface thereof, removing the coating Wc from the resin material Wb. Thereafter, the resin material Wb is discharged by the delivery unit 25.

Furthermore, it is also possible to replace the pneumatic cylinders 43 provided to the upper surface and lower surface coating removing units 110 and 120 with hydraulic cylinders 71. Oil pressure may be supplied to these hydraulic cylinders 71 by means of the hydraulic supply circuit 70 shown in FIG. 12.

Figure 15:
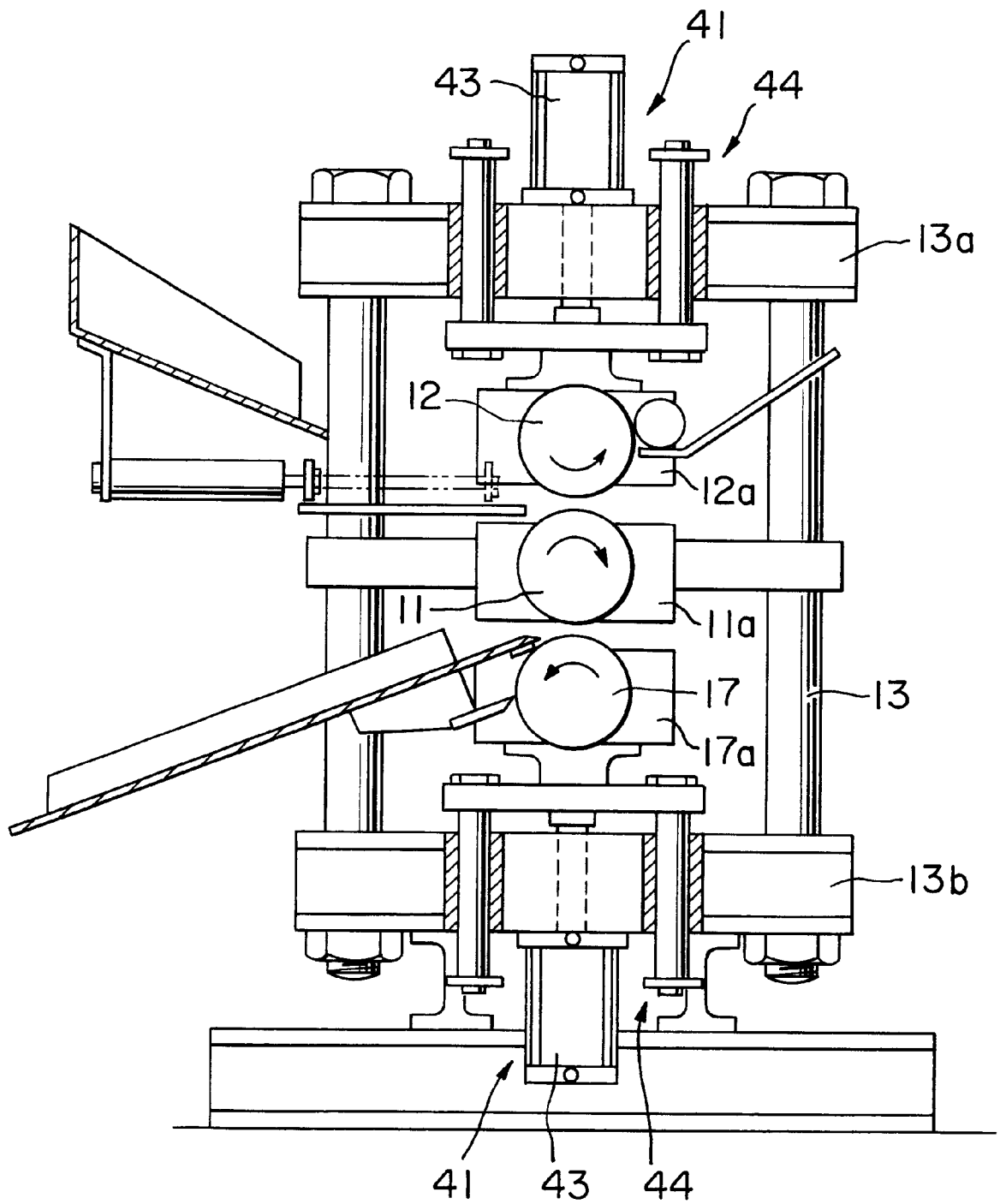
FIG. 15 is a schematic view explaining a further embodiment of the coating removing apparatus of the present invention.
Figure 16:
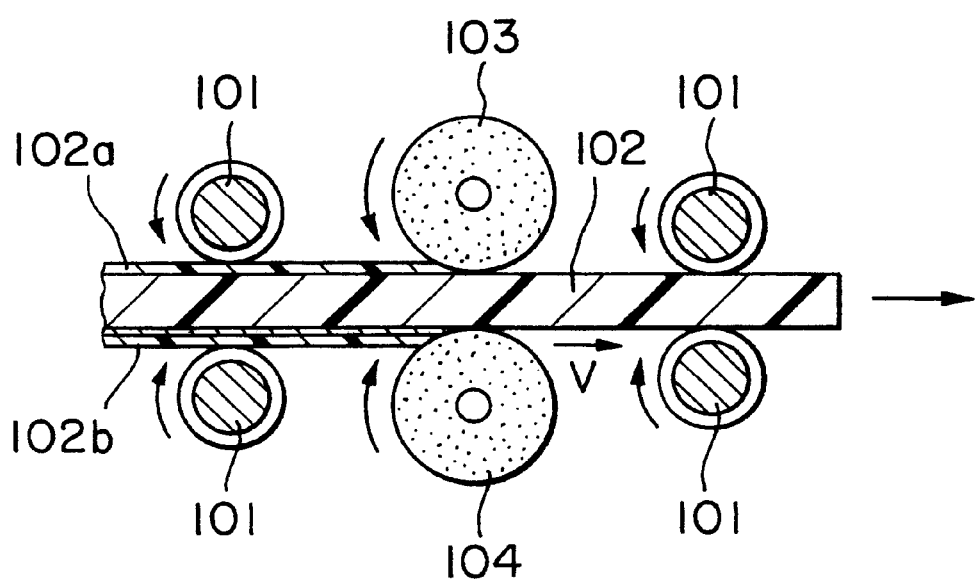
FIG. 16 is a schematic view explaining a conventional coating removing apparatus.

A further embodiment of the coating removing apparatus of the present invention will be described based on FIG. 15.

This coating removing apparatus comprises a resin-side roll 11, a coating-side roll 12, and a third roll 17 facing the resin-side roll 11.

The resin-side roll 11 is rotatably supported by resin-side roll supporting members 11a which are supported on the supporting frame 13. The coating-side roll 12 is rotatably supported by the coating-side roll supporting members 12a, which are supported on an upper supporting frame 13a by the pressing means 41 and the guiding members 44. The resin-side roll 11 and the coating-side roll 12 are rotated at different peripheral speeds, the peripheral speed of the coating-side roll 12 being higher than the peripheral speed of the resin-side roll 11. In addition, the rolls 11 and 12 rotate in opposite directions.

Air is supplied to the pneumatic cylinders 43 provided in the pressing force means 41 from the air supply circuits 51 or 70 shown in FIGS. 7 and 10.

The third roll 17 is rotatably supported on third roll supporting members 17a, which are supported by the pressing force means 41 and the guiding members 44 provided on a lower frame 13b of the supporting frame 13. The third roll 17 is rotated at a lower peripheral speed than the resin-side roll 11, and in the opposite direction thereto. In addition, air is supplied to the pneumatic cylinders 43 of the pressing force means 41 which support the third roll 17 by means of the air supply circuits 51 or 70 shown in FIGS. 7 and 10.

Therefore, the resin member Wa charged between the resin-side roll 11 and the coating-side roll 12 and rolled with fixed pressing force controlled by the pressing force means 41. In addition, the difference in the peripheral speeds to the two rolls 11 and 12 applies a fixed shear stress between the resin material Wb and the coating Wc, removing the coating Wc from the resin material Wb.

Here, since the peripheral rotational speed of the coating-side roll 12 is higher than the peripheral rotation speed of the resin-side roll 11, the resin member Wa is more largely drawn on the coating-side roll 12 than on the resin-side roll 11, so that the resin material Wb is discharged while being curved along the roll surface of the resin-side roll 11.

The resin material Wb, which has been discharged while being curved along the roll surface of the resin-side roll 11, reaches the portion between the resin-side roll 11 and the third roll 17 and is nipped therebetween.

The resin material Wb nipped between the resin-side roll 11 and the third roll 17 is rolled again by the pressing force means 41 against the resin-side roll 11 and the third roll 17. In addition, in accordance with the difference in the peripheral speeds of the rolls 11 and 17, the coating-side roll 12 and the resin-side roll 11 apply a shear stress between the resin material Wb and a coating or a mist formed on the reverse surface of the resin material Wb from which the coating Wc has already been removed, thereby removing and removing the coating or mist from the resin member Wa.

Therefore, the resin member Wa charged between the resin-side roll 11 and the coating-side roll 12 is continuously rolled by optimal pressing forces between the coating-side roll 12 and the resin-side roll 11, and between the resin-side roll 11 and the third roll 17. In addition, shear stress is applied so that the coating or mist formed on both surfaces of the resin member Wa is peeled and removed in a single step, thereby efficiently removing the coatings or mists from the resin member.

Furthermore, since the peripheral rotational speed of the third roll 17 is set to a speed higher than the peripheral rotation speed of the resin-side roll 11, by re-removing coating pieces which remain on the surfaces of the resin material Wb, from which the coating has been peeled by the resin-side roll 11 and the coating-side roll 12, it is possible to more reliably peel and remove the coating from the surfaces of the resin member.

Furthermore, hydraulic cylinders 71 may be provided instead of the pneumatic cylinders 43. By providing, for instance, the hydraulic supply circuit 70 shown in FIG. 12, or the like, these hydraulic cylinders 71 can be controlled by means of oil pressure.

According to the coating removing apparatus of the present invention explained above, a coated resin member is rolled between rolls rotating at different peripheral speeds and in different directions, while applying a shear stress between the resin material and the coating so as to remove the coating from the resin material. Furthermore, since pressing means force the rolls close together by means of a fixed force, a normally uniform shear stress is applied between the resin material and the coating even in the cases when the coated resin bodies have different thicknesses or an individual coated resin body has parts with different thicknesses. This has the excellent results of obtaining an extremely high coating removing rate, and highly efficient and stable productivity, thereby contributing considerably to recycling of a wide range of coated resin products.

While there have been described what are at present considered to be preferred embodiments of the invention, it will be understood that various modifications may be made thereto, and it is intended that the appended claims cover all such modifications as fall within the true spirit and scope of the invention.

What is claimed is:

1. An apparatus for removing a coating from a resin product having, a lower roller horizontally supported by a pair of supporting members at both ends of said lower roller and connected to first rotary drive at either one of said ends for rotating thereof, an upper roller arranged in parallel with said lower roller and borne by another pair of supporting members, said upper roller being rotated at a different speed from said lower roller and in a different direction thereof and connected to second rotary drive means via a universal joint in order to be rotatable thereby even if an axis of said upper roller becomes eccentric from that of said second rotary drive means, a work supply unit provided adjacent a gap between said lower and upper rollers for pushing said resin product therebetween, and an air cylinder mounted on said supporting member for pushing down said upper roller and for crushing said resin product, comprising:

a main line pneumatically connected to said air cylinder for supplying air from an air supply source thereto and for downwardly urging said upper roller against said lower roller;

a pressure control valve interposed in said main line for controlling a pressure of said air at a predetermined value;

a pressure switch interposed between said air cylinder and said pressure control valve for measuring a main line pressure controlled by said pressure control valve and for producing a main line pressure signal when said main line pressure is lower than a predetermined main line pressure;

a pilot line branched from said main line between pressure control valve and said air supply source;

a regulator interposed in said pilot line for controlling said main line pressure at a predetermined value by regulating said pressure control valve;

a pair of actuating switches provided adjacent said work supply unit for manual operation with both hands in order to start a removing operation of said coating from said resin product by crushing thereof between said upper and lower roller and for generating a start signal when said pair of actuating switches are simultaneously pushed;

a pair of emergency stop switches provided near said pair of actuating switches for manual operation in order to stop said removing operation of said resin product and for outputting a stop signal when either one of said pair of emergency stop switches is pushed; and a control unit for driving said first and second rotary drive means and said air cylinder when said main line pressure is higher than said predetermined main line pressure and when said start signal is received so as to press said work by said upper and lower rollers at a predetermined pressure and to effectively separate a coated film from said work and for stopping said first and second rotary drive means and retracting said air cylinder when said main line pressure is lower than said predetermined main line pressure and when said stop signal is received so as to be able to easily and safely adjust said main line pressure at an optimum pressure valve and to immediately restart said removing operation of said coating from said work.

2. The apparatus for removing a coating from a resin product according to claim 1, further comprising:

a bottom roller provided under said lower roller in parallel with said upper roller and lined up in triplicate for crushing again said resin product warped by said pair of rollers;

supporting means for supporting both ends of said bottom roller, and an air cylinder connected to said supporting means for pushing up thereof and for removing said coating from said resin product by applying a further stress thereto.

3. An apparatus for removing a coating from a resin product having, plurality of pairs of rollers horizontally arranged in tandem, a plurality of pairs of supporting members at both ends of said rollers rotary drive means connected to either one of said ends for rotating thereof, either one of said rollers being rotated at different speed from the other roller and in a different direction thereof and connected to said rotary drive via a universal joint in order to be rotatable thereby even if an axis of said other roller becomes eccentric from that of said rotary drive means, a work supply unit provided adjacent a gap between said pair of rollers for pushing said resin product therebetween, and an air cylinder mounted on each one of said supporting members for pushing said one of said pairs of rollers and for crushing said resin product, comprising:

transfer means for interposed between said pair of rollers for transferring said resin product by a plurality of pairs of rollers horizontally lined up in tandem;

a main line pneumatically connected to said air cylinder for supplying air from an air supply source thereto and for urging said one of said rollers against said other roller;

a pressure control valve interposed in said main line for controlling a pressure of said air at a predetermined valve;

a pressure switch interposed between said air cylinder and said pressure control valve for measuring a main line pressure controlled by said pressure control valve and for producing a main line pressure signal when said main line pressure is lower than a predetermined main line pressure;

a pilot line branched from said main line between said pressure control valve and said air supply source;

a regulator interposed in said pilot line for controlling said main line pressure at a predetermined value by regulating said pressure control valve;

a pair of actuating switches provided adjacent said work supply unit for manual operation with both hands in order to start a removing operation of said coating from said resin product by crushing thereof between said rollers and for generating a start signal when said pair of actuating switches are simultaneously pushed;

a pair of emergency stop switches provided near said pair of actuating switches for manual operation in order to stop said removing operation of said resin product and for outputting a stop signal when either one of said pair of emergency stop switches is pushed; and a control unit for driving said rotary drive means and said air cylinder when said main line pressure is higher than said predetermined main line pressure and when said start signal is received so as to press said work by said rollers at a predetermined pressure and to effectively separate a coated film from said work and for stopping said rotary drive means and retracting said air cylinder when said main line pressure is lower than said predetermined main line pressure and when said stop signal is received so as to be able to easily and safely adjust said main line pressure at an optimum pressure valve and to immediately restart said removing operation of said coating from said work.

4. An apparatus for removing a coating from a resin product having, a lower roller horizontally supported by a pair of supporting members at both ends of said lower roller and connected to first rotary drive at either one of said ends for rotating thereof, an upper roller arranged in parallel with said lower roller and borne by another pair of supporting members, said upper roller being rotated at a different speed from said lower roller and in a different direction thereof and connected to second rotary drive means via a universal joint in order to be rotatable thereby even if an axis of said upper roller becomes eccentric from that of said second rotary drive means, a work supply unit provided adjacent a gap between said lower and upper rollers for pushing said resin product therebetween, and an air cylinder mounted on said supporting member for pushing down said upper roller and for crushing said resin product, comprising:

a main line pneumatically connected to said air cylinder for supplying an air from an air supply source thereto and for downwardly urging said upper roller against said lower roller;

a pressure control valve interposed in said main line for controlling a pressure of said air at a predetermined valve;

a pressure switch interposed between said air cylinder and said pressure control valve for measuring a main line pressure controlled by said pressure control valve and for producing a main line pressure signal when said main line is lower than a predetermined main line pressure;

a first pilot line branched from said main line between said pressure control valve and said air supply source;

a switchover valve interposed in said first pilot line;

a second pilot line branched from said main line between said switchover valve and said air supply source;

a first regulator interposed in said first pilot line for controlling said main line pressure at a lower predetermined value;

a second regulator interposed in said second pilot line for controlling said main line pressure at a higher predetermined value;

a pair of actuating switches provided in a vicinity of said work supply unit for being manually pushable with both hands in order to start a removing operation of said coating from said resin product by crushing thereof between said upper and lower rollers and for generating a start signal when said pair of actuating switches are simultaneously pushed;

a pair of emergency stop switches provided near said pair of actuating switches for being manually pushable in order to stop said removing operation of said resin product and for outputting a stop signal when either one of said pair of emergency stop switches is pushed;

a control unit for driving said first and second rotary drive means and said air cylinder by a lower pressure of said lower predetermined value when said main line pressure is higher than said predetermined main line pressure and when said start signal is received so as to press said work by said upper and lower rollers at a first predetermined pressure and to effectively separate a coated film from said work;

said control unit driving said first and second rotary drive means and said air cylinder by a higher pressure of said higher predetermined value when said main line pressure is lower than said predetermined main line pressure and when said start signal is received so as to press said work by said upper and lower rollers at a first predetermined pressure and to effectively separate a coated film from said work; and said control unit stopping said first and second rotary drive means and for retracting said air cylinder when said main line pressure is lower than said predetermined main line pressure and when said stop signal is received so as to be able to easily and safely adjust said main line pressure at an optimum pressure value and to immediately restart said removing operation of said coating from said work.

5. The apparatus for removing a coating from a resin product according to claim 4, further comprising;

a bottom roller provided under said lower roller in parallel with said upper roller and lined up in triplicate for crushing again said resin product warped by said pair of rollers;

supporting means for supporting both ends of said bottom roller; and an air cylinder connected to said supporting means for pushing up thereof and for removing said coating from said resin product by urging a further stress thereto.

6. An apparatus for removing a coating from a resin product having, a plurality of pairs of rollers horizontally arranged in tandem, a plurality of pairs of supporting members at both ends of said rollers rotary drive means connected to either one of said ends for rotating thereof, either one of said rollers being rotated at different speed from the other roller and in a different direction thereof and connected to said rotary drive via a universal joint in order to be rotatable thereby even if an axis of said other roller becomes eccentric from that of said rotary drive means, a work supply unit provided adjacent a gap between said pair of rollers for pushing said resin product therebetween, and an air cylinder mounted on each one of said supporting members for pushing said one of said pairs of rollers and for crushing said resin product, comprising:

transfer means interposed between said pairs of rollers for transferring said resin product by a plurality of pairs of small rollers horizontally lined up in tandem;

a main line pneumatically connected to said air cylinder for supplying an air from an air supply source thereto and for urging said one of said rollers against said other roller;

a pressure control valve interposed in said main line for controlling a pressure of said air at a predetermined value;

a pressure switch interposed between said air cylinder and said pressure control valve for measuring a main line pressure controlled by said pressure control valve and for producing a main line pressure signal when said main line pressure is lower than a predetermined main line pressure;

a first pilot line branched from said main line between said pressure control valve and said air supply source;

a switchover valve interposed in said first pilot line;

a second pilot line branched from said main line between said switchover valve and said air supply source;

a first regulator interposed in said first pilot line for controlling said main line pressure at a lower predetermined value;

a second regulator interposed in said second pilot line for controlling said main line pressure at a higher predetermined value;

a pair of actuating switches provided adjacent said work supply unit for manual operation with both hands in order to start a removing operation of said coating from said resin product by crushing thereof between said upper and lower rollers and for generating a start signal when said pair of actuating switches are simultaneously pushed;

a pair of emergency stop switches provided near said pair of actuating switches for manual operation in order to stop said removing operation of said resin product and for outputting a stop signal when either one of said pair of emergency stop switches is pushed;

a control unit for driving said first and second rotary drive means and said air cylinder by a lower pressure of said lower predetermined value when said main line pressure is higher than said predetermined main line pressure and when said start signal is received so as to press said work by said upper and lower rollers at a first predetermined pressure and to effectively separate a coated film from said work;

said control unit driving said first and second rotary drive means and said air cylinder by a higher pressure of said higher predetermined value when said main line pressure is lower than said predetermined main line pressure and when said start signal is received so as to press said work by said upper and lower rollers at a first predetermined pressure and to effectively separate a coated film from said work; and said control unit stopping said first and second rotary drive means and for retracting said air cylinder when said main line pressure is lower than said predetermined main line pressure and when said stop signal is received so as to be able to easily and safely adjust said main line pressure at an optimum pressure value and to immediately restart said removing operation of said coating from said work.

7. An apparatus for removing a coating from a resin product having, a lower roller horizontally supported by a pair of supporting members at both ends of said lower roller and connected to first rotary drive at either one of said ends for rotating thereof, an upper roller arranged in parallel with said lower roller and borne by another pair of supporting members, said upper roller being rotated at a different speed from said lower roller and in a different direction thereof and connected to second rotary drive means via a universal joint in order to be rotatable thereby even if an axis of said upper roller becomes eccentric from that of said second rotary drive means, a work supply unit provided adjacent a gap between said lower and upper rollers for pushing said resin product therebetween and a hydraulic cylinder mounted on said supporting member for pushing down said upper roller and for crushing said resin product, comprising:

a first line hydraulically connected to said hydraulic cylinder for supplying a fluid from a fluid source thereto and for downwardly urging said upper roller against said lower roller;

a pressure control valve interposed in said first line for controlling a pressure of said fluid at a predetermined valve;

a pressure switch interposed between said hydraulic cylinder and said pressure control valve for measuring a first line pressure controlled by said pressure control valve and for producing a first line pressure signal when said first line pressure is lower than a predetermined first line pressure;

a switchover valve interposed in said first line;

a first relief valve interposed between said switchover valve and said pressure control valve;

a second line hydraulically connected in parallel with said first line between said pressure control valve and said switchover valve;

a regulator connected to said first line between said switchover valve and said fluid supply source for controlling said first line pressure at a predetermined valve;

a pair of actuating switches provided adjacent said work supply unit for manual operation with both hands in order to start a removing operation of said coating from said resin product by crushing thereof between said upper and lower rollers and for generating a star signal when said pair of actuating switches are simultaneously pushed;

a pair of emergency stop switches provided near said pair of actuating switches for manual operation in order to stop said removing operation of said resin product and for outputting a stop signal when either one of said pair of emergency stop switches is pushed; and a control unit for driving said first and second rotary drive means and said hydraulic cylinder when said first line pressure is higher than said predetermined first line pressure and when said start signal is received so as to press said work by said upper and lower rollers at a predetermined pressure and to effectively separate a coated film from said work and for stopping said first and second rotary drive means and retracting said hydraulic cylinder when said first line pressure is lower than said predetermined first line pressure and when said stop signal is received so as to be able to easily and safely adjust said first line pressure at an optimum pressure value and to immediately restart said removing operation of said coating from said work.

8. The apparatus for removing a coating from a resin product according to claim 7 further comprising:

a bottom roller provided under said lower roller in parallel with said upper roller and lined up in triplicate for crushing again said resin product warped by said pair of rollers;

supporting means for supporting both ends of said bottom roller; and a hydraulic cylinder connected to said supporting means for pushing up thereof and for removing said coating from said resin product by applying a further stress thereto.

9. An apparatus for removing a coating from a resin product having, a plurality of pairs of rollers horizontally arranged in tandem, a plurality of pairs of supporting members at both ends of said rollers rotary drive means connected to either one of said ends for rotating thereof, either one of said rollers being rotated at different speed from the other roller and in a different direction thereof and connected to said rotary drive via a universal joint in order to be rotatable thereby even if an axis of said other roller becomes eccentric from that of said rotary drive means, a work supply unit provided adjacent a gap between said pair of rollers for pushing said resin product therebetween, and an air cylinder mounted on each one of said supporting members for pushing said one of said pairs of rollers and for crushing said resin product, comprising:

transfer means for interposed between said pair of rollers for transferring said resin product by a plurality of pairs of small rollers horizontally lined up in tandem;

a first line hydraulically connected to said hydraulic cylinder for supplying a fluid from a fluid supply source thereto and for downwardly urging said upper roller against said lower roller;

a pressure control valve interposed in said first line for controlling a pressure of said fluid at a predetermined value;

a pressure switch interposed between said hydraulic cylinder and said pressure control valve for measuring a first line pressure controlled by said pressure control valve and for producing a first line pressure signal when said first line pressure is lower than a predetermined first line pressure;

a switchover valve interposed in said first line;

a first relief valve interposed between said switchover valve and said pressure control valve;

a second line hydraulically connected in parallel with said first line between said pressure control valve and said switchover valve;

a regulator connected to said first line between said switchover valve and said fluid supply source for controlling said first line pressure at a predetermined value;

a pair of actuating switches provided adjacent said work supply unit for manual operation with both hands in order to start a removing operation of said coating from said resin product by crushing thereof between said upper and lower rollers and for generating a start signal when said pair of actuating switches are simultaneously pushed;

a pair of emergency stop switches provided near said pair of actuating switches for manual operation in order to stop said removing operation of said resin product and for outputting a stop signal when either one of said pair of emergency stop switches is pushed; and a control unit for driving said first and second rotary drive means and said hydraulic cylinder when said first line pressure is higher than said predetermined first line pressure and when said start signal is received so as to press said work by said upper and lower rollers at a predetermined pressure and to effectively separate a coated film from said work and for stopping said first and second rotary drive means and retracting said hydraulic cylinder when said first line pressure is lower than said predetermined first line pressure and when said stop signal is received so as to be able to easily and safely adjust said first line pressure at an optimum pressure value and to immediately restart said removing operation of said coating from said work.

\* \* \* \* \*